(12) United States Patent
Ota

(10) Patent No.: US 9,720,210 B2
(45) Date of Patent: Aug. 1, 2017

(54) IMAGING LENS AND IMAGING APPARATUS EQUIPPED WITH THE IMAGING LENS

(71) Applicant: FUJIFILM Corporation, Tokyo (JP)

(72) Inventor: Motoari Ota, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/920,896

(22) Filed: Oct. 23, 2015

(65) Prior Publication Data

US 2016/0116715 A1    Apr. 28, 2016

(30) Foreign Application Priority Data

Oct. 28, 2014   (JP) ................ 2014-218919

(51) Int. Cl.
*G02B 13/00*    (2006.01)
*G02B 9/62*    (2006.01)

(52) U.S. Cl.
CPC ............ *G02B 13/0045* (2013.01); *G02B 9/62* (2013.01); *G02B 13/004* (2013.01)

(58) Field of Classification Search
CPC ....... G02B 13/0045; G02B 9/62; G02B 13/04

USPC ........ 359/752, 756, 757, 713, 733, 754, 776
See application file for complete search history.

(56) References Cited

U.S. PATENT DOCUMENTS

| 2014/0320980 A1 | 10/2014 | Chen |
| 2014/0355134 A1* | 12/2014 | Sekine ................ G02B 9/62 359/713 |
| 2015/0116570 A1 | 4/2015 | Tsai et al. |

FOREIGN PATENT DOCUMENTS

| TW | 201333575 | 8/2013 |
| TW | 201405162 | 2/2014 |

* cited by examiner

*Primary Examiner* — Thomas K Pham
*Assistant Examiner* — Alberto Betancourt
(74) *Attorney, Agent, or Firm* — Jianq Chyun IP Office

(57) ABSTRACT

An imaging lens consisting essentially of six lenses, composed of, in order from the object side, a first lens having a positive refractive power with a convex surface on the object side, a second lens having a negative refractive power, a third lens having a positive refractive power, a fourth lens having a positive refractive power, a fifth lens having a negative refractive power with a concave surface on the image side, and a sixth lens having a negative refractive power, in which predetermined conditional expressions are satisfied.

20 Claims, 10 Drawing Sheets

EXAMPLE 1

FIG.1  EXAMPLE 1

FIG.2  EXAMPLE 2

FIG.3  EXAMPLE 3

FIG.4  EXAMPLE 4

FIG.5   EXAMPLE 1

IMAGING LENS AND IMAGING APPARATUS EQUIPPED WITH THE IMAGING LENS

CROSS-REFERENCE TO RELATED APPLICATIONS

The present application claims priority under 35 U.S.C. §119 to Japanese Patent Application No. 2014-218919 filed on Oct. 28, 2014. The above application is hereby expressly incorporated by reference, in its entirety, into the present application.

BACKGROUND

The present disclosure relates to a fixed-focus imaging lens that forms an optical image of a subject on an image sensor such as, for example, a charge coupled device (CCD) or a complementary metal oxide semiconductor (CMOS), and an imaging apparatus equipped with the imaging lens to perform imaging, such as a digital still camera, a camera equipped cell phone, a personal digital assistance (PDA), a smartphone, a tablet terminal, a portable game machine, or the like.

Along with a widespread use of personal computers in homes, digital still cameras capable of inputting image information, such as captured landscapes and portraits, to personal computers are spreading rapidly. In addition, more and more cell phones, smartphones, and tablet terminals are equipped with camera modules for inputting images. Such devices having imaging capabilities use image sensors, such as CCDs, CMOSs, and the like. Recently, as downsizing of these image sensors have advanced, imaging devices as a whole and imaging lenses to be equipped therein are also demanded to be downsized. At the same time, higher pixilation of image sensors is also in progress, and high resolution and high performance are demanded for imaging lenses. For example, performance compatible with 5 mega pixels or greater, more preferably, 8 mega pixels or greater is demanded.

In order to meet such demands, an imaging lens composed of a relatively large number of lenses, i.e., five lenses, is proposed, and an imaging lens composed of six lenses is also proposed. For example, Taiwanese Patent Publication No. 201333575 and Taiwanese Patent Publication No. 201405162 propose six-element imaging lenses.

SUMMARY

In the meantime, for imaging lenses with relatively short overall lens lengths used, in particular, for cell phones, smartphones, and tablet terminals, a reduction in overall lens length and an increase in angle of view are demanded so as to support image sensors having large image sizes to meet the demand for high pixilation, and a small F-number is also expected. It is difficult for the imaging lenses described in Taiwanese Patent Publication No. 201333575 and Taiwanese Patent Publication No. 201405162, however, to achieve a small F-numbers that meet the expectation.

The present disclosure has been developed in view of the foregoing points, and the present disclosure provides an imaging lens capable of supporting high pixilation by achieving a reduction in overall lens length, an increase in angle of view, and a small F-number, and realizing high imaging performance from the central angle of view to the peripheral angle of view, and an imaging apparatus capable of capturing a high resolution image by equipping the imaging lens.

An imaging lens of the present disclosure consists of six lenses, composed of, in order from the object side, a first lens having a positive refractive power with a convex surface on the object side, a second lens having a negative refractive power, a third lens having a positive refractive power, a fourth lens having a positive refractive power, a fifth lens having a negative refractive power with a concave surface on the image side, and a sixth lens having a negative refractive power, wherein the following conditional expressions are satisfied:

$$0 < f/f1 < 1.22 \tag{1}$$

$$-0.68 < f/f2 < 0 \tag{2}$$

$$-0.15 < f/L6f < 1.25 \tag{3}$$

where:
f is the focal length of the entire system;
f1 is the focal length of the first lens;
f2 is the focal length of the second lens; and
L6f is the paraxial radius of curvature of the object side surface of the sixth lens.

In the imaging lens of the present disclosure, the term "consists of six lenses" refers to include the case in which that the imaging lens of the present disclosure includes a lens having substantially no refractive power, an optical element other than a lens, such as a stop, a cover glass, and the like, a lens flange, a lens barrel, an image sensor, and a mechanical component, for example, a camera shake correction mechanism, other than the six lenses. The surface shapes and the signs of refractive powers of the foregoing lenses are considered in the paraxial region if an aspherical surface is involved. Further, the sign of a radius of curvature is positive for a surface shape with a convex surface on the object side and negative for a surface shape with a convex surface on the image side.

In the imaging lens of the present disclosure, the optical performance may be further improved by employing and satisfying the following preferable configurations.

In the imaging lens of the present disclosure, the sixth lens preferably has a concave surface on the image side.

In the imaging lens of the present disclosure, the fourth lens preferably has a meniscus shape with a concave surface on the object side.

In the imaging lens of the present disclosure, the second lens preferably has a meniscus shape with a convex surface on the object side.

In the imaging lens of the present disclosure, the fifth lens preferably has a biconcave shape.

In the imaging lens of the present disclosure, the third lens preferably has a convex shape on the object side.

The imaging lens of the present disclosure preferably satisfies any one or any combination of the following conditional expressions (4) to (11), conditional expressions (1-1) to (5-1).

$$0.31 < f/f1 < 1.2 \tag{1-1}$$

$$-0.68 < f/f2 < -0.1 \tag{2-1}$$

$$-0.1 < f/L6f < 0.9 \tag{3-1}$$

$$0.15 < f/f3 < 3 \tag{4}$$

$$0.15 < f/f3 < 1.7 \tag{4-1}$$

$$0.65 < f/f4 < 3 \tag{5}$$

$$0.68 < f/f4 < 2.1 \tag{5-1}$$

$$-3 < f/f6 < -0.5 \tag{6}$$

$$0.5 < (L1r+L1f)/(L1r-L1f) < 3 \tag{7}$$

$$-0.55 < (L5r+L5f)/(L5r-L5f) < 1 \tag{8}$$

$$-7.5 < (L4r+L4f)/(L4r-L4f) < 0 \tag{9}$$

$$-1.4 < f \cdot P34 < 0 \tag{10}$$

$$0.5 < f \cdot \tan\omega / L6r < 20 \tag{11}$$

where:
f is the focal length of the entire system;
f1 is the focal length of the first lens;
f2 is the focal length of the second lens;
f3 is the focal length of the third lens;
f4 is the focal length of the fourth lens;
f6 is the focal length of the sixth lens;
L1f is the paraxial radius of curvature of the object side surface of the first lens;
L1r is the paraxial radius of curvature of the image side surface of the first lens;
L4f is the paraxial radius of curvature of the object side surface of the fourth lens;
L4r is the paraxial radius of curvature of the image side surface of the fourth lens;
L5f is the paraxial radius of curvature of the object side surface of the fifth lens;
L5r is the paraxial radius of curvature of the image side surface of the fifth lens;
L6f is the paraxial radius of curvature of the object side surface of the sixth lens;
L6r is the paraxial radius of curvature of the image side surface of the sixth lens;
ω is the maximum half angle of view when an object at infinity is in focus; and
P34 is the refractive power of the air lens formed between the image side surface of the third lens and the object side surface of the fourth lens, and the refractive power of the air lens may be obtained by the following formula (P)

$$P34 = \frac{1-Nd3}{L3r} + \frac{Nd4-1}{L4f} - \frac{(1-Nd3)\times(Nd4-1)\times D7}{L3r \times L4f} \tag{P}$$

where:
Nd3 is the refractive index of the third lens with respect to the d-line;
Nd4 is the refractive index of the fourth lens with respect to the d-line;
L3r is the paraxial radius of curvature of the image side surface of the third lens;
L4f is the paraxial radius of curvature of the object side surface of the fourth lens; and
D7 is the air space between the third lens and the fourth lens on the optical axis.

An imaging apparatus according to the present disclosure is equipped with the imaging lens of the present disclosure.

According to the imaging lens of the present disclosure, the configuration of each lens element is optimized in a lens configuration of six elements in total. This may realize a lens system capable of supporting high pixilation in which a reduction in overall lens length, an increase in angle of view, and a small F-number are achieved, and high imaging performance from the central angle of view to the peripheral angle of view is realized.

According to the imaging apparatus of the present disclosure, a high resolution image may be captured because the apparatus is configured to output an imaging signal according to an optical image formed by any of high performance imaging lenses of the present disclosure.

DETAILED DESCRIPTION OF THE PREFERRED EMBODIMENTS

Hereinafter, embodiments of the present disclosure will be described in detail with reference to the accompanying drawings.

Figure 1:
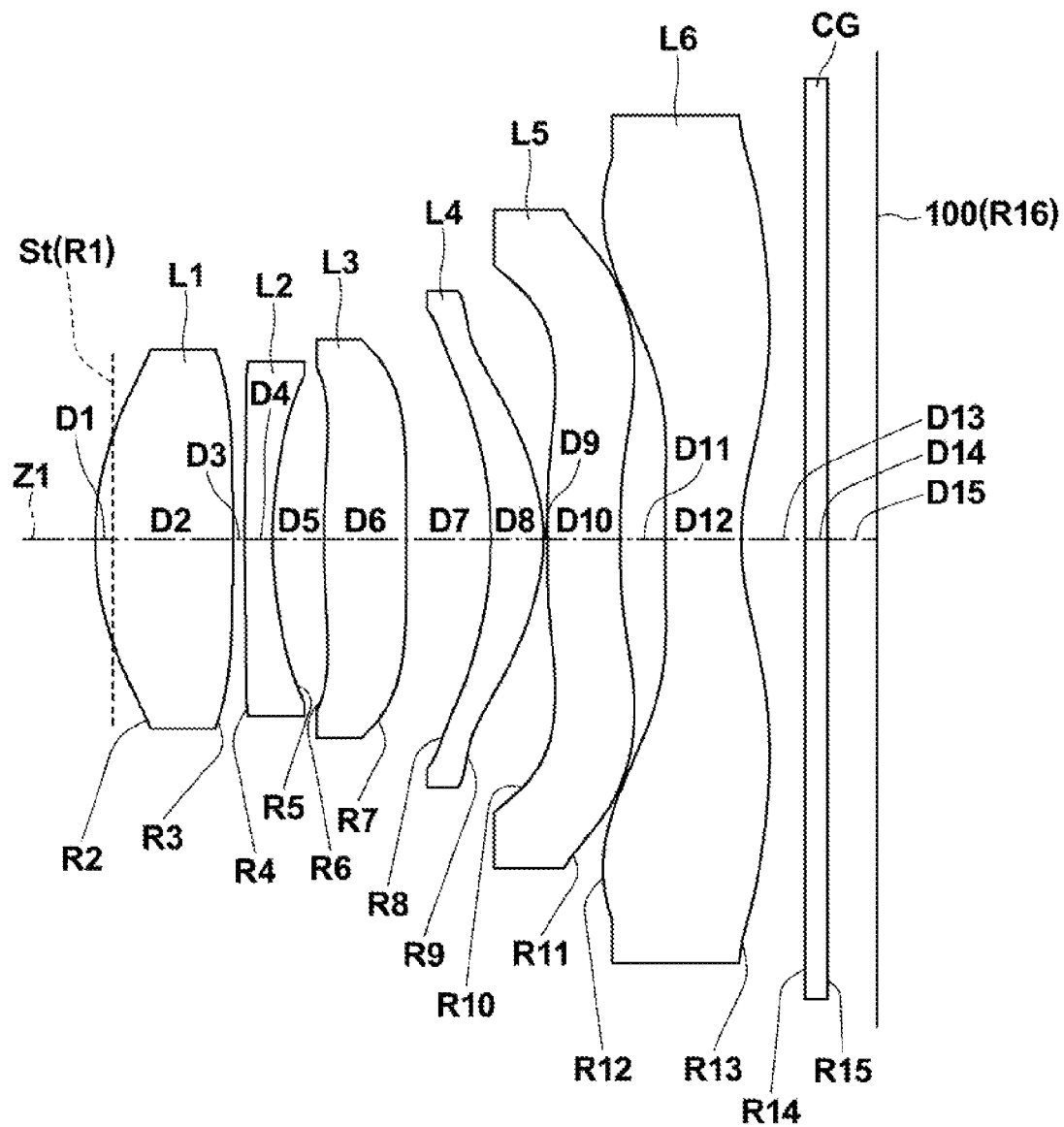
FIG. 1 is a cross-sectional view of an imaging lens according to an embodiment of the present disclosure, illustrating a first configuration example, which corresponds to Example 1.
Figure 2:
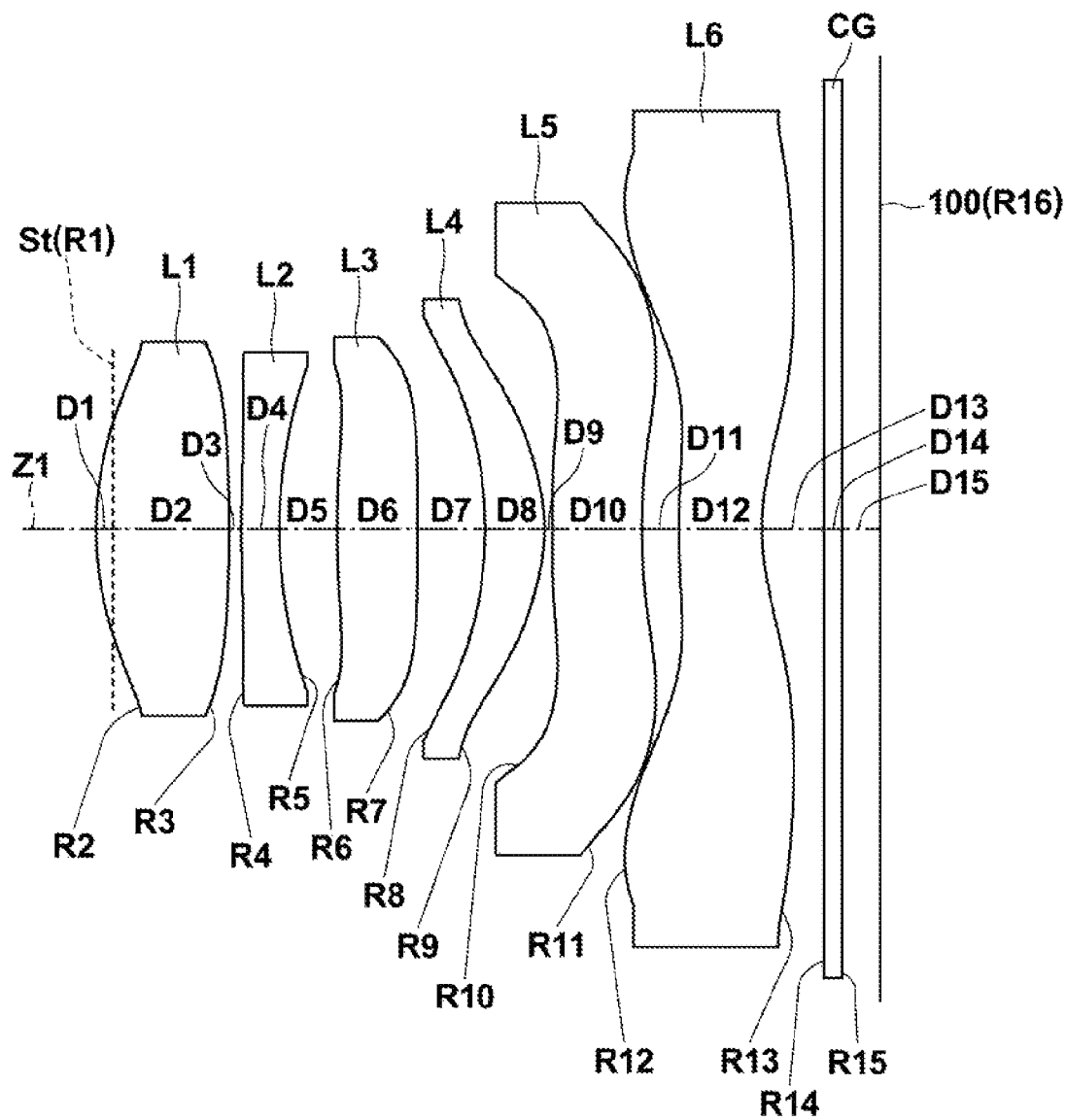
FIG. 2 is a cross-sectional view of an imaging lens according to an embodiment of the present disclosure, illustrating a second configuration example, which corresponds to Example 2.
Figure 3:
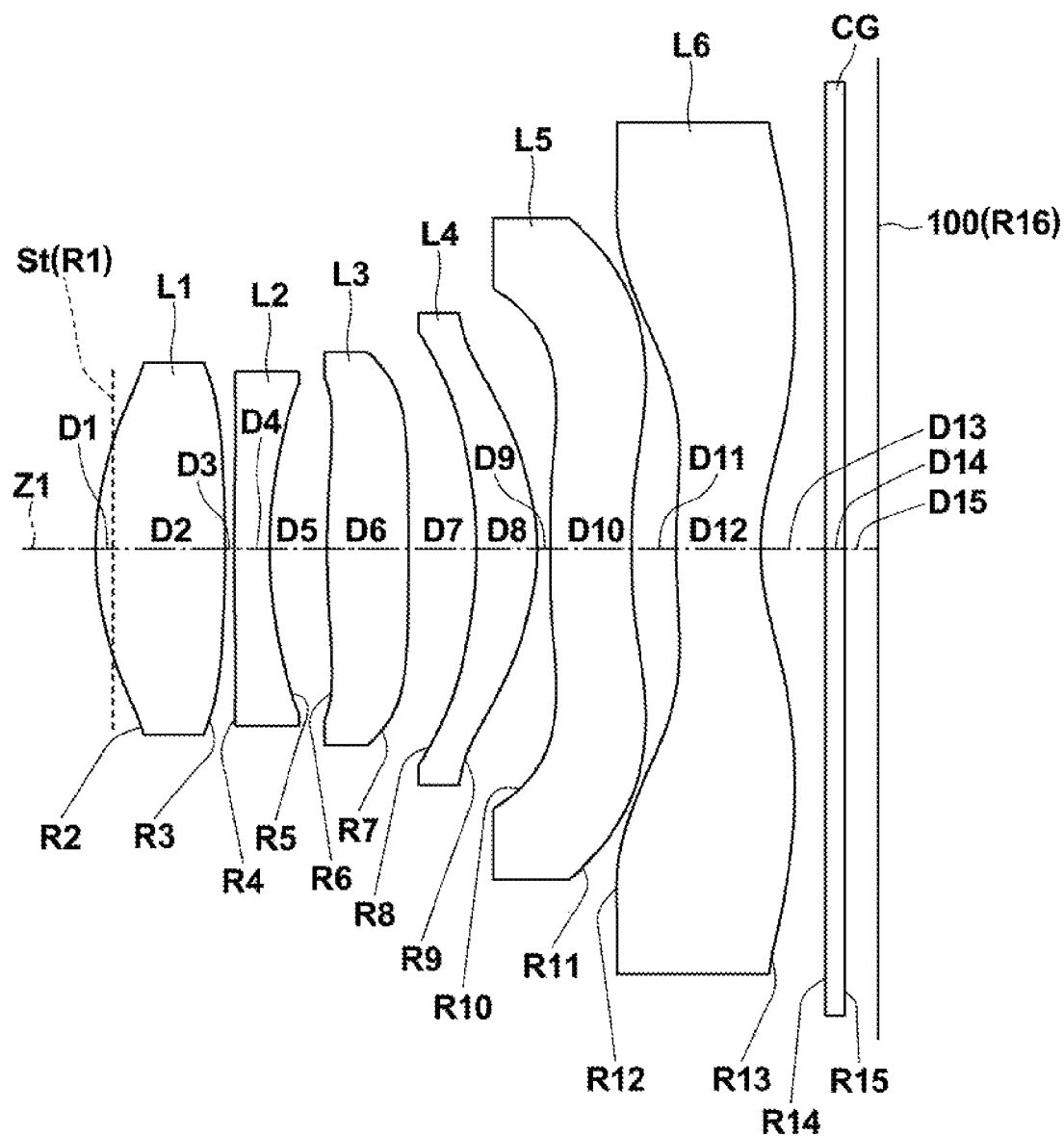
FIG. 3 is a cross-sectional view of an imaging lens according to an embodiment of the present disclosure, illustrating a third configuration example, which corresponds to Example 3.
Figure 4:
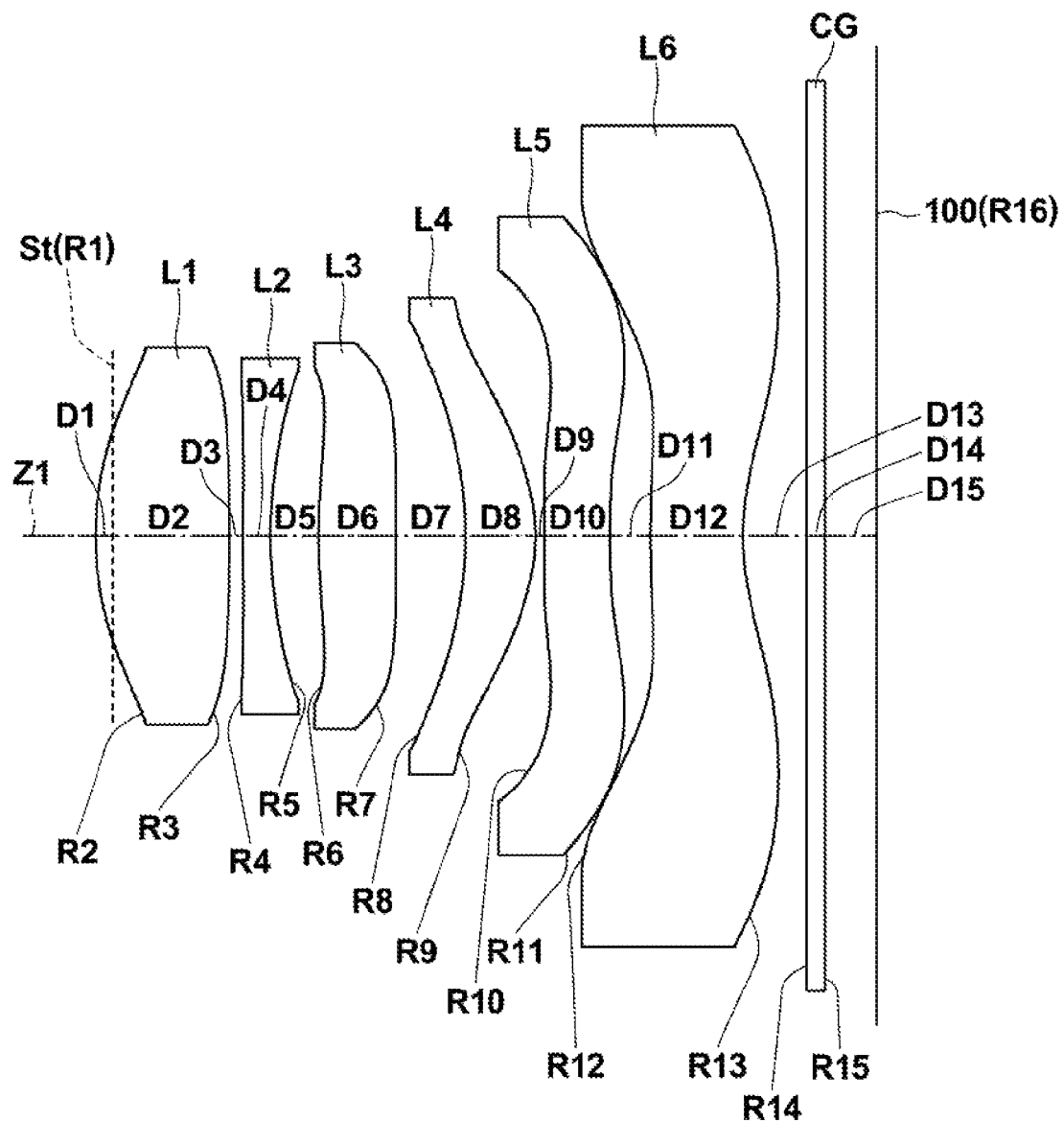
FIG. 4 is a cross-sectional view of an imaging lens according to an embodiment of the present disclosure, illustrating a fourth configuration example, which corresponds to Example 4.
Figure 5:
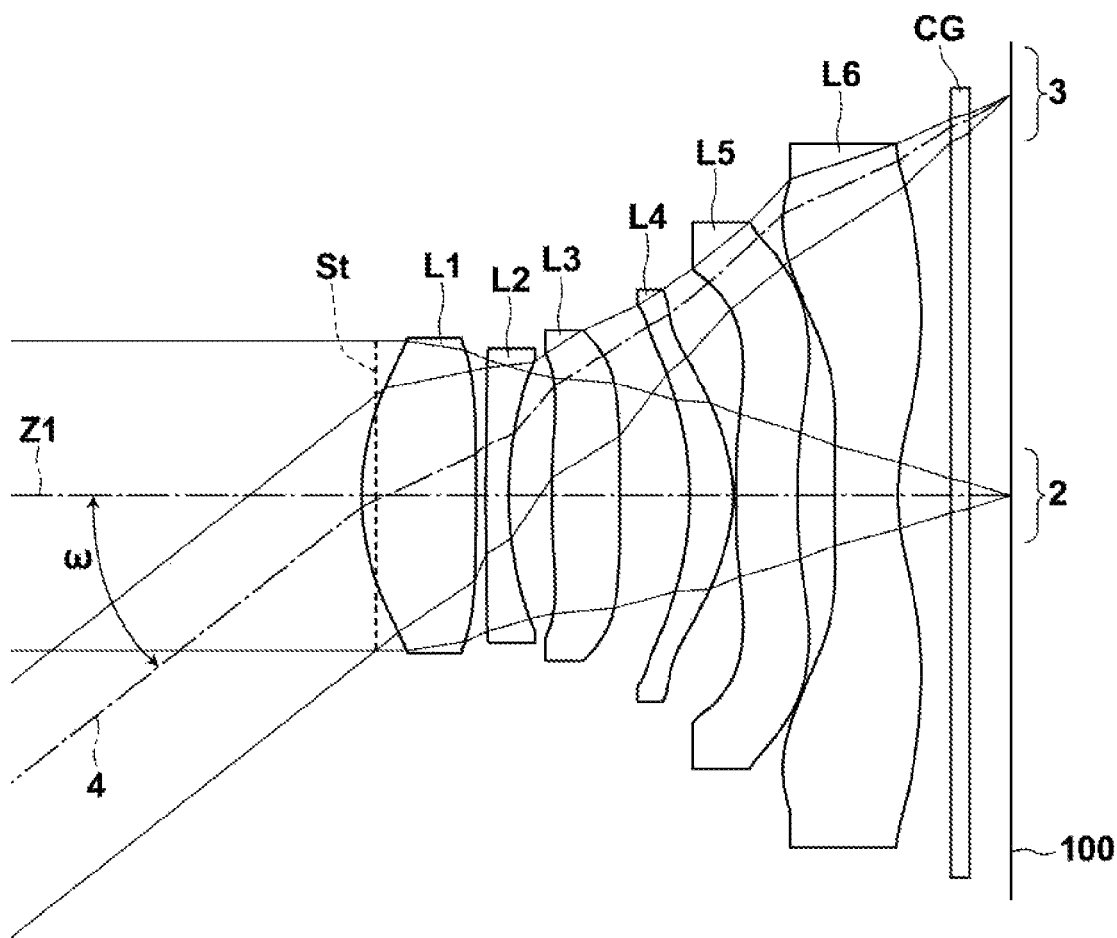
FIG. 5 is a ray diagram of the imaging lens illustrated in FIG. 1.

FIG. 1 illustrates a first configuration example in cross-section of an imaging lens according to a first embodiment. This configuration example corresponds to the lens configuration of a first numerical example (Tables 1 and 2) to be described later. Likewise, second to fourth configuration examples in cross-section corresponding to numerical examples (Tables 3 to 8) according to the second to fourth embodiments, to be described later, are shown in FIGS. 2 to 4 respectively. In FIGS. 1 to 4, the symbol Ri indicates a radius of curvature of $i^{th}$ surface in which a number i is given to each surface in a serially increasing manner toward the image side (imaging side) with the most object side lens element surface being taken as the first surface. The symbol Di indicates a surface distance on the optical axis Z1 between $i^{th}$ surface and $(i+1)^{th}$ surface. As the basic configuration of each configuration example is identical, a description will be made, hereinafter, based on the configuration example of imaging lens shown in FIG. 1, and the configuration examples shown in FIGS. 2 to 4 will be described, as required. FIG. 5 is a ray diagram of the imaging lens shown in FIG. 1, illustrating each optical path of an axial light beam 2 and a maximum angle of view light beam 3, and a maximum half angle of view ω when an object at infinity is in focus. Note that a maximum angle of view principal ray 4 in the maximum angle of view light beam 3 is illustrated by a dot-and-dash line.

An imaging lens L according to an embodiment of the present disclosure is suitable for use in various types of imaging devices and systems that use image sensors such as, for example, a CCD and a CMOS, in particular, relatively small portable terminal devices and systems, including digital still cameras, camera-equipped cell phones, smartphones, tablet terminals, and PDAs. The imaging lens L includes a first lens L1, a second lens L2, a third lens L3, a fourth lens L4, a fifth lens L5, and a sixth lens L6 in order from the object side along the optical axis Z1.

Figure 10:
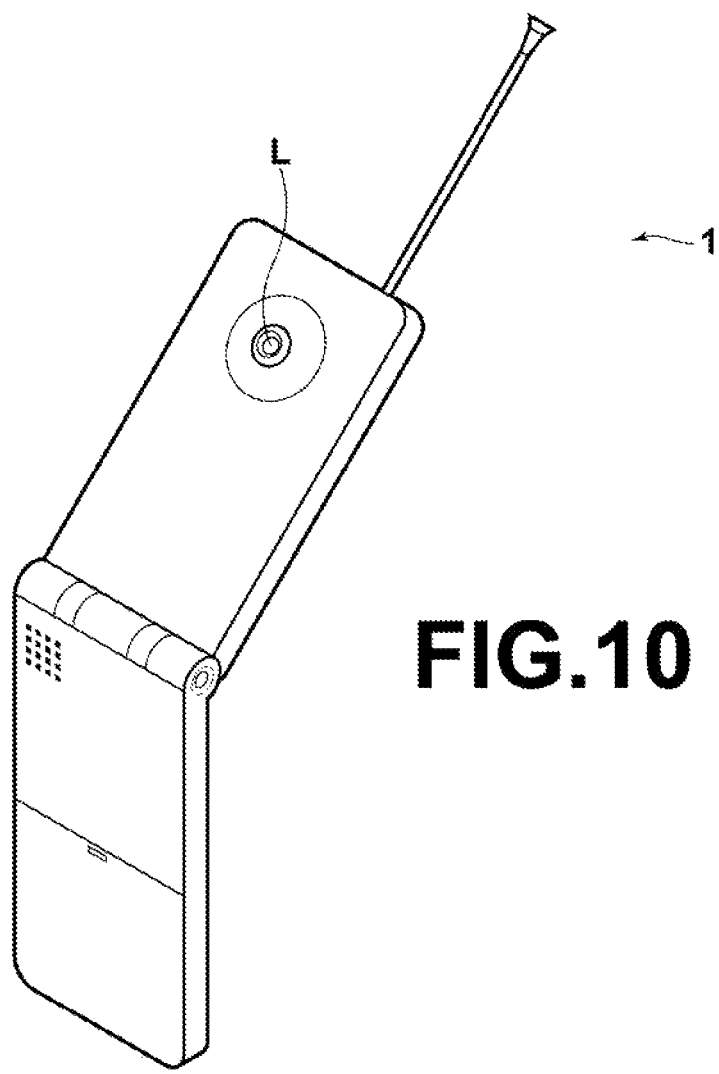
FIG. 10 illustrates an imaging apparatus, which is a cell phone terminal, equipped with the imaging lens of the present disclosure.

FIG. 10 is a schematic view of a cell phone terminal which is an imaging apparatus 1 according to an embodiment of the present disclosure. The imaging apparatus 1 according to an embodiment of the present disclosure includes the imaging lens L according to the present embodiment and an image sensor 100 (refer to FIG. 1), such as a CCD, that outputs an imaging signal according to an optical image formed by the imaging lens L. The image sensor 100 is disposed on the imaging surface (image plane R16 in FIGS. 1 to 4) of the imaging lens L.

Figure 11:
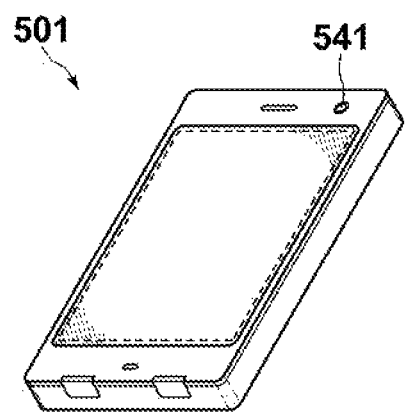
FIG. 11 illustrates an imaging apparatus, which is a smartphone, equipped with the imaging lens of the present disclosure.

FIG. 11 is a schematic view of a smartphone which is an imaging apparatus 501 according to an embodiment of the present disclosure. The imaging apparatus 501 according to an embodiment of the present disclosure includes a camera section 541 which includes the imaging lens L according to the present embodiment and an image sensor 100 (refer to FIG. 1), such as a CCD, that outputs an imaging signal according to an optical image formed by the imaging lens L. The image sensor 100 is disposed on the imaging surface (image plane) of the imaging lens L.

Various types of optical members CG may be disposed between the sixth lens L6 and the image sensor 100 according to the camera side structure to which the lens is mounted. For example, a plate-like optical member, for example, a cover glass for protecting the image plane or an infrared cut filter may be disposed. In this case, for example, a plate-like cover glass with a coating having a filtering effect, such as an infrared cut filter or an ND filter, or with a material having an identical effect may be used as the optical member CG.

Further, an effect comparable to that of the optical member CG may be given by applying a coating on the sixth lens L6, without using the optical member CG. This allows a reduction in the number of parts and overall length.

Preferably, the imaging lens L includes an aperture stop St disposed on the object side of the object side surface of the second lens L2. The disposition of the aperture stop St in such a manner may prevent the incident angles of light rays passing through the optical system with respect to the imaging surface (image sensor) from increasing, in particular, in a peripheral portion of the imaging area. The term "disposed on the object side of the object side surface of the second lens L2" as used herein refers to that the position of the aperture stop St in an optical axis direction is located at the same position as the intersection point between the axial marginal ray and the object side surface of the second lens L2 or on the object side of the intersection point. In order to further enhance the effect, the aperture stop St is preferably disposed on the object side of the object side surface of the first lens L1. The term "disposed on the object side of the object side surface of the first lens L1" as used herein refers to that the position of the aperture stop St in an optical axis direction is located at the same position as the intersection point between the axial marginal ray and the object side surface of the first lens L1 or on the object side of the intersection point. In the present embodiment, the lenses of the first to fourth configuration examples (FIGS. 1 to 4) are those in which the aperture stop St is disposed on the object side of the object side surface of the first lens L1. The aperture stop St shown in each of the drawings does not necessarily represent the size or the shape and indicates the position on the optical axis Z1.

In the imaging lens L, the first lens L1 has a positive refractive power near the optical axis. This is advantageous for reducing the overall lens length. Further, the first lens L1 has a convex surface on the object side near the optical axis. This allows the rear principal point to be moved easily to the object side, and the overall lens length may be reduced favorably. The first lens L1 may have a meniscus shape with a convex surface on the object side near the optical axis. In this case, it is easier to move the rear side principal point to the object side, and the overall lens length may be reduced more favorably. Further, the first lens L1 may have a biconvex shape near the optical axis. In this case, spherical aberration may be corrected satisfactorily.

The second lens L2 has a negative refractive power near the optical axis. This allows longitudinal chromatic aberration and spherical aberration to be corrected satisfactorily, which is advantageous for realizing a small F-number. Preferably, the second lens L2 has a meniscus shape with a convex surface on the object side near the optical axis. This allows astigmatism to be corrected satisfactorily, while suppressing the generation of spherical aberration.

Both the third lens L3 and the fourth lens L4 have positive refractive powers near the optical axis. Both the fifth lens L5 and the sixth lens L6 have negative refractive powers near the optical axis. If the first lens L1 to the fourth lens L4 are viewed as a positive first lens group, while the fifth lens L5 to sixth lens L6 are viewed as a negative second lens group, the imaging lens L may have a telephoto-type configuration and the overall lens length may be reduced favorably. The telephoto arrangement of the imaging lens L and the successive positive refractive power arrangement of the third lens L3 and the fourth lens L4 of the positive first lens group composed of the first lens L1 to the fourth lens L4 allow the refractive power of the entire positive first lens group composed of the first lens L1 to the fourth lens L4 to be increased while suppressing the refractive powers of the third lens L3 and the fourth lens L4, whereby spherical aberration, astigmatism, and the like may be corrected satisfactorily, while overall lens length is reduced.

Preferably, the third lens L3 has a convex surface on the object side near the optical axis. This allows spherical aberration to be corrected satisfactorily. The third lens L3 may have a biconvex shape. This allows spherical aberration to be corrected further satisfactorily. Further, the third lens L3 may have a meniscus shape with a convex surface on the object side near the optical axis. This makes it easy to move the rear principal point of the third lens L3 toward the object side more favorably, whereby the overall lens length may be reduced favorably.

Preferably, the fourth lens L4 has a meniscus shape with a concave surface on the object side near the optical axis. This allows astigmatism to be corrected satisfactorily.

The fifth lens L5 has a concave surface on the image side near the optical axis. This allows the overall lens length to be reduced favorably. Further, the fifth lens L5 preferably has a biconcave shape near the optical axis. This allows astigmatism to be corrected easily, since the fifth lens L5 has a concave shape on the object side. Further, forming the fifth lens L5 in a biconcave shape near the optical axis makes it easy to form the fifth lens L5 so as to have a sufficiently strong negative refractive power, whereby the second lens group composed of the fifth lens L5 and the sixth lens L6 may have a sufficiently strong negative refractive power and the effect of reducing the overall lens length due to telephoto arrangement is obtained favorably.

Preferably, the sixth lens L6 has a concave shape on the image side near the optical axis. This allows field curvature to be corrected satisfactorily. Further, the sixth lens L6 may have a meniscus shape with a convex shape on the object side near the optical axis. This makes it easy to move the rear principal point of the imaging lens L toward the object side, whereby the overall lens length may be reduced favorably and field curvature may be corrected satisfactorily. Further, the sixth lens L6 may have a biconcave shape near the optical axis. This allows distortion to be corrected satisfactorily, while maintaining the negative refractive power of the sixth lens L6, whereby incident angles of light rays passing through the imaging lens L with respect to the imaging surface (image sensor) are prevented from increasing favorably, in particular, in the intermediate angle of view.

Further, the image side surface of the sixth lens L6 preferably has an aspherical shape with at least one inflection point located inward in a radial direction from the intersection point between the image side surface and the maximum angle of view principal ray toward the optical axis. This may prevent the incident angles of light rays passing through the optical system with respect to the imaging surface (image sensor) from increasing, in particular, in a peripheral portion of the imaging area. Further, forming the image side surface of the sixth lens L6 in an aspherical shape with at least one inflection point located inward in a radial direction from the intersection point between the image side surface and the maximum angle of view principal ray toward the optical axis allows distortion to be corrected satisfactorily. The term "inflection point" on the image side surface of the sixth lens L6 refers to a point where the surface shape of the image side surface changes from a convex shape to a concave shape (or from a concave shape to a convex shape) toward the image side. The term "from the intersection point between the image side surface and the maximum angle of view principal ray toward the optical axis" as used herein refers to the same position as the intersection point between the image side surface and the maximum angle of view principal ray or a position located further inward in a radial direction from the intersection point toward the optical axis. The inflection point on the image side surface of the sixth lens L6 may be disposed at the same position as the intersection point between the image side surface and the maximum angle of view principal ray or at any position further inward in a radial direction from the intersection point toward the optical axis.

The use of single lenses for the first lens L1 to the sixth lens L6 constituting the imaging lens L described above may increase the number of lens surfaces in comparison with the case where a cemented lens is used for any of the first lens L1 to the sixth lens L6, whereby design flexibility may be increased and the overall lens length may be reduced favorably.

According to the foregoing imaging lens L, the configuration of each lens element from the first lens L1 to the sixth lens L6 is optimized in a lens configuration of six elements in total. This may achieve a reduction in overall lens length, an increase in angle of view, and a small F-number, and a lens system having high imaging performance from the central angle of view to the peripheral angle of view, which may support high pixilation, may be realized.

Preferably, each of the first lens L1 to the sixth lens L6 has an aspherical shape on at least one surface for higher performance of the imaging lens L.

Next, operations and effects of the imaging lens L configured in the manner described above with respect to conditional expressions will be described in further detail. Preferably, the imaging lens L satisfies any one or any combination of the following conditional expressions. Preferably, a conditional expression to be satisfied by the imaging lens L is selected, as appropriate, according to the requirements of the imaging lens L.

First, the focal length f1 of the first lens L1 and the focal length f of the entire system preferably satisfy the following conditional expression (1).

$$0 < f/f1 < 1.22 \tag{1}$$

The conditional expression (1) defines a preferable numerical range of the ratio of the focal length f of the entire system to the focal length f1 of the first lens L1. Securing the refractive power of the first lens L1 such that the value of the conditional expression (1) remains above the lower limit allows the positive refractive power of the first lens L1 to be prevented from being too weak relative to the refractive power of the entire system, whereby the overall lens length may be reduced favorably. Suppressing the refractive power of the first lens L1 such that the value of the conditional expression (1) remains below the upper limit allows the positive refractive power of the first lens L1 to be prevented from being too strong relative to the refractive power of the entire system, whereby spherical aberration may be corrected satisfactorily, which is advantageous for achieving a small F-number. Keeping the value of the conditional expression (1) to remain below the upper limit allows astigmatism to be corrected satisfactorily, which is advantageous for achieving a small F-number. In order to further enhance the effects, it is preferable that the following conditional expression (1-1) is satisfied.

$$0.31 < f/f1 < 1.2 \tag{1-1}$$

The focal length f2 of the second lens L2 and the focal length f of the entire system preferably satisfy the following conditional expression (2).

$$-0.68 < f/f2 < 0 \tag{2}$$

The conditional expression (2) defines a preferable numerical range of the ratio of the focal length f of the entire system to the focal length f2 of the second lens L2. Suppressing the refractive power of the second lens L2 such that the value of the conditional expression (2) remains above the lower limit allows the negative refractive power of the second lens L2 to be prevented from being too strong relative to the refractive power of the entire system, whereby the overall lens length may be reduced favorably. Securing the refractive power of the second lens L2 such that the value of the conditional expression (2) remains below the upper limit allows the negative refractive power of the second lens L2 to be prevented from being too weak relative to the refractive power of the entire system, whereby spherical aberration and longitudinal chromatic aberration may be corrected satisfactorily, which is advantageous for achieving a small F-number. In order to further enhance the effects, it is preferable that a conditional expression (2-1) is satisfied.

$$-0.68 < f/f2 < -0.1 \tag{2-1}$$

The focal length f of the entire system and the paraxial radius of curvature L6f of the object side surface of the sixth lens L6 preferably satisfy the following conditional expression (3).

$$-0.15 < f/L6f < 1.25 \tag{3}$$

The conditional expression (3) defines a preferable numerical range of the ratio of the focal length f to the paraxial radius of curvature L6f of the object side surface of the sixth lens L6. Setting the focal length f of the entire system to the paraxial radius of curvature L6f of the object side surface of the sixth lens L6 such that the value of the conditional expression (3) remains above the lower limit allows the absolute value of the paraxial radius of curvature L6f of the object side surface of the sixth lens L6 to be prevented from being too small relative to the focal length of the entire system, whereby field curvature may be corrected sufficiently, while realizing reduction in overall lens length. Setting the paraxial radius of curvature L6f of the object side surface of the sixth lens L6 to the focal length f of the entire system such that the value of the conditional expression (3) remains below the upper limit allows the absolute value of the paraxial radius of curvature L6f of the object side surface of the sixth lens L6 to be prevented from being too small relative to the focal length f of the entire system, whereby the negative refractive power of the sixth lens L6 may be secured, while preventing the burden of refractive power on the image side surface of the sixth lens L6 from being increased excessively. Therefore, satisfying the upper limit of the conditional expression (3) allows distortion to be corrected satisfactorily and incident angles of light rays passing through the imaging lens L with respect to the imaging surface (image sensor) are prevented from increasing favorably, in particular, in the intermediate angle of view. In order to further enhance the effects, it is more preferable that the following conditional expression (3-1) is satisfied.

$$-0.1 < f/L6f < 0.9 \tag{3-1}$$

The focal length f3 of the third lens L3 and the focal length f of the entire system preferably satisfy the following conditional expression (4).

$$0.15 < f/f3 < 3 \tag{4}$$

The conditional expression (4) defines a preferable numerical range of the ratio of the focal length f of the entire system to the focal length f3 of the third lens L3. It is preferable that the refractive power of the third lens L3 to the refractive power of the entire system is secured such that the value of the conditional expression (4) remains above the lower limit. This allows the refractive power of the third lens L3 to be prevented from being too weak relative to the refractive power of the entire system, which is advantageous for reducing the overall lens length. Suppressing the refractive power of the third lens L3 to the refractive power of the entire system such that the value of the conditional expression (4) remains below the upper limit allows the refractive power of the third lens L3 to be prevented from being too strong relative to the refractive power of the entire system, whereby the generation of spherical aberration may be suppressed satisfactorily. In order to further enhance the effects, it is preferable that the following conditional expression (4-1) is satisfied.

$$0.15 < f/f3 < 1.7 \tag{4-1}$$

The focal length f4 of the fourth lens L4 and the focal length f of the entire system preferably satisfy the following conditional expression (5).

$$0.65 < f/f4 < 3 \tag{5}$$

The conditional expression (5) defines a preferable numerical range of the ratio of the focal length f4 of the fourth lens. L4 to the focal length f of the entire system. Securing the refractive power of the fourth lens L4 such that the value of the conditional expression (5) remains above the lower limit allows the positive refractive power of the fourth lens L4 to be prevented from being too weak relative to the refractive power of the entire system, which is advantageous for reducing the overall lens length. Suppressing the refractive power of the fourth lens L4 such that the value of the conditional expression (5) remains below the upper limit allows the positive refractive power of the fourth lens L4 to be prevented from being too strong relative to the refractive power of the entire system, whereby the generation of spherical aberration may be suppressed satisfactorily. In order to further enhance the effects, it is more preferable that the following conditional expression (5-1) is satisfied.

$$0.68 < f/f4 < 2.1 \tag{5-1}$$

The focal length f6 of the sixth lens L6 and the focal length f of the entire system preferably satisfy the following conditional expression (6).

$$-3 < f/f6 < -0.5 \tag{6}$$

The conditional expression (6) defines a preferable numerical range of the ratio of the focal length f of the entire system to the focal length f6 of the sixth lens L6. Suppressing the refractive power of the sixth lens L6 such that the value of the conditional expression (6) remains above the lower limit of the conditional expression (6) allows the negative refractive power of the sixth lens L6 to be prevented from being too strong relative to the refractive power of the entire system, whereby incident angles of light rays passing through the optical system with respect to the imaging surface (image sensor) may be prevented from increasing in the intermediate angle of view. Securing the refractive power of the sixth lens L6 such that the value of the conditional expression (6) remains below the upper limit of the conditional expression (6) allows the negative refractive power of the sixth lens L6 to be prevented from being too weak relative to the refractive power of the entire system, whereby the overall lens length may be reduced favorably.

The paraxial radius of curvature L1f of the object side surface of the first lens L1 and the paraxial radius of curvature L1r of the image side surface of the first lens L1 preferably satisfy the following conditional expression (7).

$$0.5 < (L1r + L1f)/(L1r - L1f) < 3 \tag{7}$$

The conditional expression (7) defines a preferable numerical range of the paraxial radius of curvature L1f of the object side surface of the first lens L1 and the paraxial radius of curvature L1r of the image side surface of the first lens L1. Forming the first lens L1 such that the value of the conditional expression (7) remains above the lower limit allows the overall lens length to be reduced favorably. Forming the first lens L1 such that the value of the conditional expression (7) remains below the upper limit allows the generation of spherical aberration to be suppressed satisfactorily.

The paraxial radius of curvature L5f of the object side surface of the fifth lens L5 and the paraxial radius of curvature L5r of the image side surface of the fifth lens L5 preferably satisfy the following conditional expression (8).

$$-0.55 < (L5r+L5f)/(L5r-L5f) < 1 \quad (8)$$

The conditional expression (7) defines a preferable numerical range of the paraxial radius of curvature L5f of the object side surface of the fifth lens L5 and the paraxial radius of curvature L5r of the image side surface of the fifth lens L5. Forming the fifth lens L5 such that the value of the conditional expression (8) remains above the lower limit allows the absolute value of the paraxial curvature of the image side surface of the fifth lens L5 to be prevented from being too small, whereby spherical aberration may be corrected satisfactorily. Forming the fifth lens L5 such that the value of the conditional expression (8) remains below the upper limit allows the absolute value of the radius of curvature of the object side surface of the fifth lens L5 to be prevented from being too large, whereby astigmatism may be corrected satisfactorily.

The paraxial radius of curvature L4f of the object side surface of the fourth lens L4 and the paraxial radius of curvature L4r of the image side surface of the fourth lens L4 preferably satisfy the following conditional expression (9).

$$-7.5 < (L4r+L4f)/(L4r-L4f) < 0 \quad (9)$$

The conditional expression (9) defines a preferable numerical range of the paraxial radius of curvature L4f of the object side surface of the fourth lens L4 and the paraxial radius of curvature L4r of the image side surface of the fourth lens L4. Forming the fourth lens L4 such that the value of the conditional expression (9) remains above the lower limit allows the absolute value of the paraxial radius of curvature L4r of the image side surface of the fourth lens L4 to be prevented from being too small, whereby spherical aberration may be corrected satisfactorily. Forming the fourth lens L4 such that the value of the conditional expression (9) remains below the upper limit allows the absolute value of the paraxial radius of curvature L4f of the fourth lens L4 to be prevented from being too large, whereby astigmatism may be corrected satisfactorily.

The focal length f of the entire system and the refractive power P34 of an air lens formed between the image side surface of the third lens L3 and the object side surface of the fourth lens L4 preferably satisfy the following conditional expression (10).

$$-1.4 < f \cdot P34 < 0 \quad (10)$$

Here, the P34 may be obtained by the following formula (P) using the refractive index Nd3 of the third lens L3 with respect to the d-line, the refractive index Nd4 of the fourth lens L4 with respect to the d-line, the paraxial radius of curvature L3r of the image side surface of the third lens L3, the paraxial radius of curvature L4f of the object side surface of the fourth lens L4, and the air space D7 between the third lens L3 and the fourth lens L4 on the optical axis.

$$P34 = \frac{1-Nd3}{L3r} + \frac{Nd4-1}{L4f} - \frac{(1-Nd3) \times (Nd4-1) \times D7}{L3r \times L4f} \quad (P)$$

As the refractive power is the inverse of the focal length, if the focal length of the air lens formed between the image side surface of the third lens L3 and the object side surface of the fourth lens L4 is taken as f34a, the conditional expression (10) defines a preferable numerical range of the ratio of the focal length f of the entire system to the f34a. Configuring the lens system such that the value of the conditional expression (10) remains above the lower limit allows the refractive power of the air lens formed between the image side surface of the third lens L3 and the object side surface of the fourth lens L4 to be prevented from being too strong, whereby distortion may be corrected satisfactorily. Configuring the lens system such that the value of the conditional expression (10) remains below the upper limit allows the refractive power of the air lens formed between the image side surface of the third lens L3 and the object side surface of the fourth lens L4 to be prevented from being too weak, whereby astigmatism may be corrected satisfactorily.

The focal length f of the entire system, the maximum half angle of view ω when an object at infinity in focus, and the paraxial radius of curvature L6r of the image side surface of the sixth lens L6 preferably satisfy the following conditional expression (11).

$$0.5 < f \cdot \tan \omega / L6r < 20 \quad (11)$$

The conditional expression (11) defines a preferable numerical range of the ratio of the paraxial radius of curvature L6r of the image side surface of the sixth lens L6 to the paraxial image height (f·tan ω). Setting the paraxial image height (f·tan ω) to the paraxial radius of curvature of the image side surface of the sixth lens L6 such that the value of the conditional expression (11) remains above the lower limit allows the absolute value of the paraxial radius of curvature L6r of the image side surface of the sixth lens L6 which is the most image side surface of the imaging lens L to be prevented from being too large relative to the paraxial image height (f·tan ω), whereby field curvature may be corrected sufficiently, while realizing reduction in the overall lens length. Note that, as indicated in the imaging lens L of each embodiment, if the sixth lens L6 is formed in an aspherical shape having at least one inflection point with a concave surface on the image side and the lower limit of the conditional expression (11) is satisfied, the field curvature may be corrected satisfactorily from the central angle of view to the peripheral angle of view, which is advantageous for realizing a wide angle of view. Setting the paraxial radius of curvature L6r of the image side surface of the sixth lens to the paraxial image height (f·tan ω) such that the value of the conditional expression (11) remains below the upper limit allows the absolute value of the paraxial radius of curvature L6r of the image side surface of the sixth lens L6 which is the most image side surface of the imaging lens L to be prevented from being too small relative to the paraxial image height (f·tan ω), whereby incident angles of light rays passing through the imaging lens L with respect to the imaging surface (image sensor) are prevented from increasing favorably, in particular, in the intermediate angle of view, and excessive correction of the field curvature is prevented.

As described above, according to the imaging lens L of an embodiment of the present disclosure, the configuration of each lens element is optimized in a lens configuration of six elements in total. This may achieve a reduction in overall lens length, an increase in angle of view, and a small F-number, and a lens system having high imaging performance from the central angle of view to the peripheral angle of view, which may support high pixilation, may be realized.

Satisfying a preferable condition, as appropriate, allows a higher imaging performance to be realized. According to the imaging apparatus of the present embodiment, a high resolution captured image may be obtained from the central angle of view to the peripheral angle of view since the apparatus is configured to output an imaging signal according to an optical image formed by the imaging lens having high performance of the present embodiment.

For example, if each of the first lens L1 to the sixth lens L6 of the foregoing imaging lens L is configured so as to have a maximum angle of view of 75 degrees or more when an object at infinity is in focus, as in the imaging lenses according to the first to the fourth embodiments, it is easy to realize a reduction in overall lens length relative to the image size, and the imaging lens L may favorably be applied to an image sensor with a size that meet the requirement of higher resolution, such as a cell phone. Further, for example, if each of the first lens L1 to the sixth lens L6 of the foregoing imaging lens L is configured so as to have a F-number smaller than 1.7, the imaging lens L may favorably respond to the demand for higher resolution.

Next, specific numerical examples of imaging lenses according to the embodiments of the present disclosure will be described. Hereinafter, a plurality of numerical examples is described collectively.

Tables 1 and 2, to be shown later, show specific lens data corresponding to the configuration of the imaging lens illustrated in FIG. 1. More specifically, Table 1 shows basic lens data, while Table 2 shows aspherical surface data. The surface number Si column in the lens data shown in Table 1 indicates $i^{th}$ surface number of the imaging lens according to Example 1 in which a number i is given to each surface in a serially increasing manner toward the image side with the object side surface of the most object side optical element being taken as the first surface. The radius of curvature Ri column indicates the value (mm) of radius of curvature of $i^{th}$ surface from the object side in relation to the symbol Ri given in FIG. 1. Likewise, the surface distance Di column indicates the surface distance (mm) on the optical axis between $i^{th}$ surface Si and $(i+1)^{th}$ surface Si+1. The Ndj column indicates the value of the refractive index of $i^{th}$ optical element from the object side with respect to the d-line (wavelength 587.6 nm) and the vdj column indicates the value of the Abbe number of $j^{th}$ optical element from the object side with respect to the d-line.

Table 1 also includes the aperture stop St and the optical member CG. In Table 1, the term (St) is indicated in the surface number column of the surface corresponding to the aperture stop St in addition to the surface number, and the term (IMG) is indicated in the surface number column of the surface corresponding to the image plane in addition to the surface number. The sign of the radius of curvature is positive if the surface shape is convex on the object side and negative if it is convex on the image side. As various types of data, values of focal length f (mm) of the entire system, back focus Bf (mm), F-number Fno., and total angle of view 2ω (°) are given in the upper margin of each lens data. Note that the back focus Bf indicates an air equivalent value.

In the imaging lens according to Example 1, both surfaces of the first lens L1 to the sixth lens L6 have aspherical surface shapes. As the radii of curvature of these aspherical surfaces, the basic lens data of Table 1 show numerical values of radii of curvature near the optical axis (paraxial radii of curvature).

Table 2 shows aspherical surface data of the imaging lens of Example 1. In a numerical value shown as aspherical surface data, the symbol "E" indicates that the subsequent numerical value is an "exponent" to base 10 and the numerical value preceding "E" is multiplied by the numerical value represented by the exponent to base 10. For example, "1.0E-02" represents "$1.0\times10^{-2}$".

As for the aspherical surface data, values of each coefficient An and KA in an aspherical surface shape formula represented by the following formula (A) are indicated. More specifically, Z indicates the length (mm) of a vertical line from a point on the aspheric surface at a height h to a tangential plane of the vertex of the aspherical surface (plane orthogonal to the optical axis).

$$Z = \frac{C \times h^2}{1 + \sqrt{1 - KA \times C^2 \times h^2}} + \sum_n An \times h^n \tag{A}$$

where:
Z: depth of the aspherical surface (mm)
h: distance from the optical axis to the lens surface (height) (mm)
C: paraxial curvature=1/R (R: paraxial radius of curvature)
An: $n^{th}$ order aspherical surface coefficient (n is an integer not less than 3)
KA: aspherical surface coefficient As in the foregoing imaging lens of Example 1, specific lens data corresponding to the imaging lens configurations illustrated in FIGS. 2 to 4 are given in Tables 3 to 8, as Examples 2 to 4. In the imaging lenses according to Example 1 to 4, both surfaces of the first lens L1 to the sixth lens L6 all have aspherical shapes.

Figure 6:
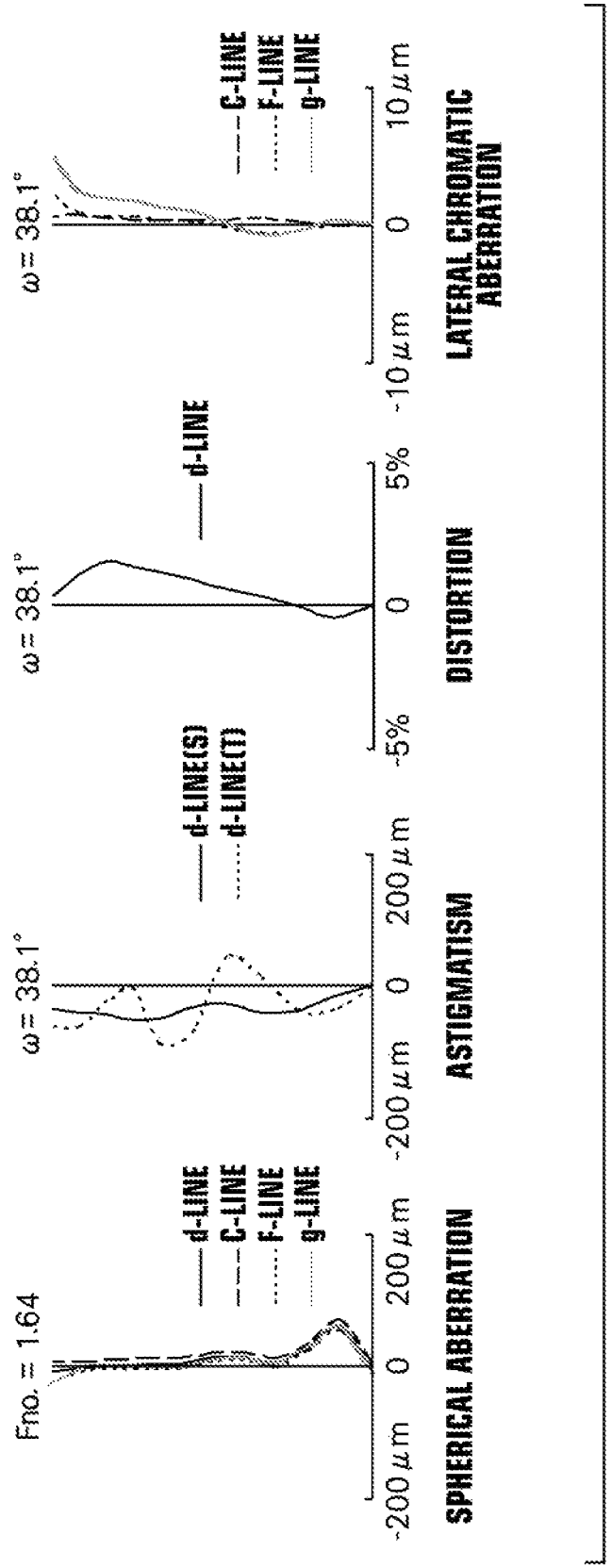
FIG. 6 shows aberration diagrams of the imaging lens according to Example 1, in which spherical aberration, astigmatism, distortion, and lateral chromatic aberration are illustrated in order from the left.

FIG. 6 shows aberration diagrams representing spherical aberration, astigmatism, distortion, and lateral chromatic aberration of Example 1 in order from the left. Each aberration diagram of spherical aberration, astigmatism (field curvature), and distortion illustrates aberration with the d-line (wavelength 587.6 nm) as the reference wavelength, but the spherical aberration diagram also illustrates aberrations with respect to the F-line (wavelength 486.1 nm), the C-line (wavelength 656.3 nm), and the g-line (wavelength 435.8 nm), while the lateral chromatic aberration diagram illustrates aberrations with respect to the F-line, the C-line, and the g-line. In the astigmatism diagram, the solid line illustrates aberration in the sagittal direction (S) and the broken line illustrates aberration in the tangential direction (T). The Fno. and ω represent the F-number and the maximum half angle of view when an object at infinity is in focus respectively.

Figure 7:
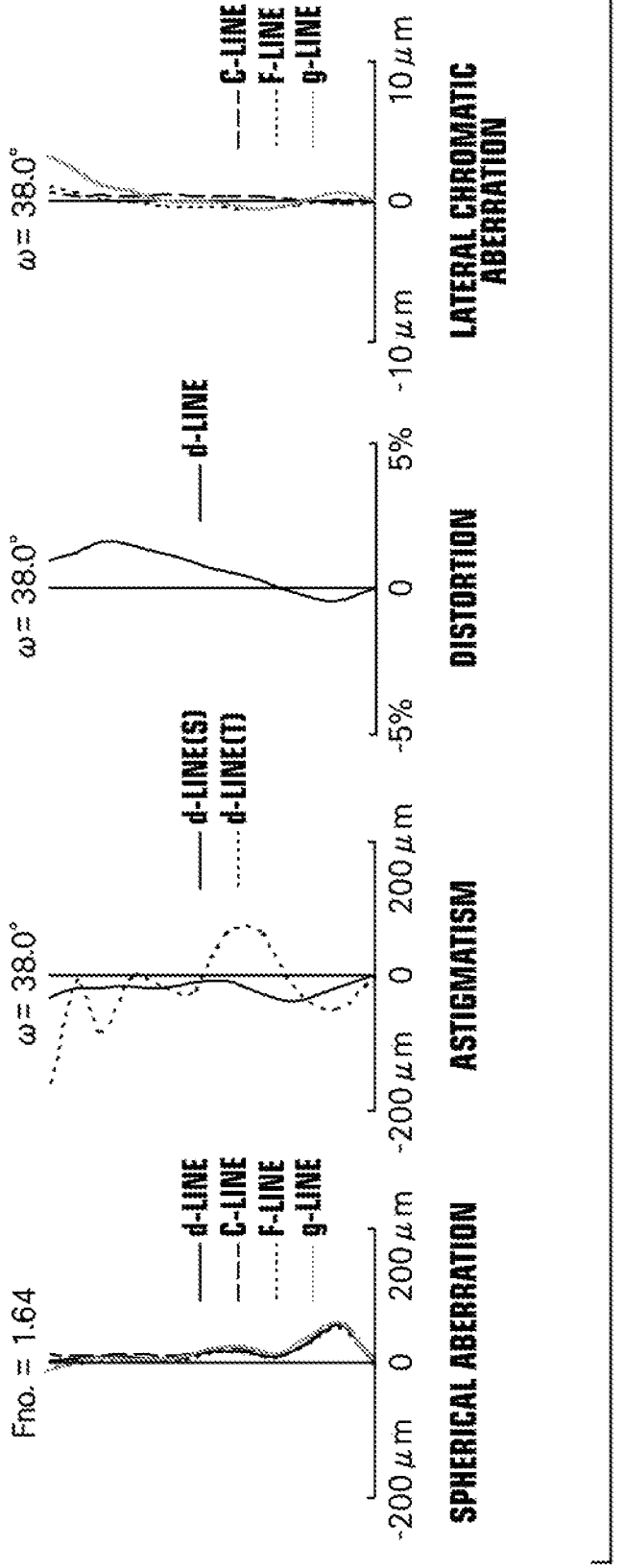
FIG. 7 shows aberration diagrams of the imaging lens according to Example 2, in which spherical aberration, astigmatism, distortion, and lateral chromatic aberration are illustrated in order from the left.
Figure 8:
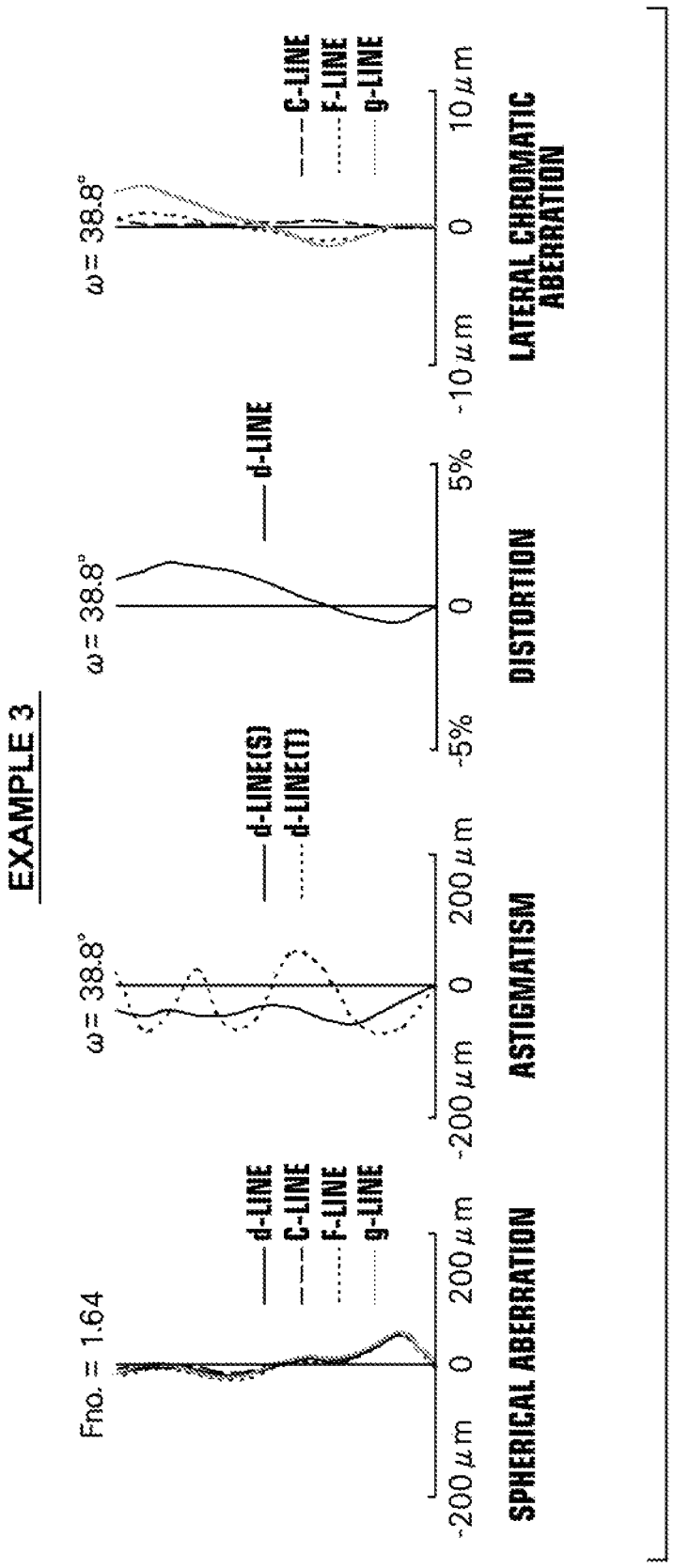
FIG. 8 shows aberration diagrams of the imaging lens according to Example 3, in which spherical aberration, astigmatism, distortion, and lateral chromatic aberration are illustrated in order from the left.
Figure 9:
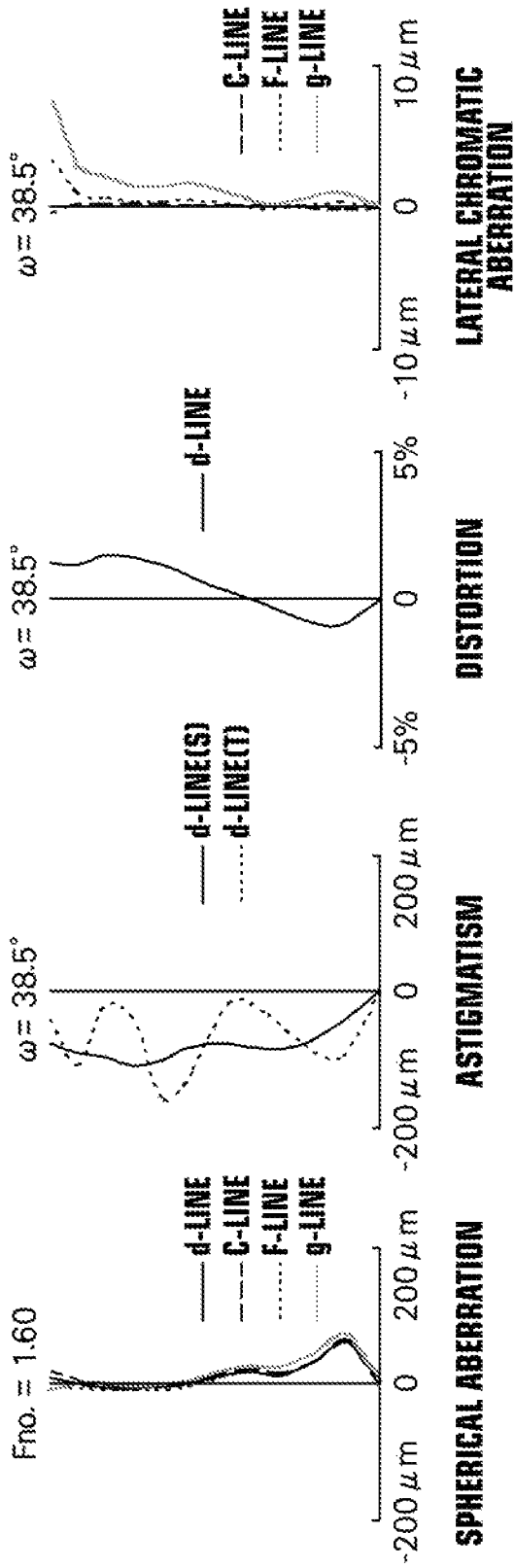
FIG. 9 shows aberration diagrams of the imaging lens according to Example 4, in which spherical aberration, astigmatism, distortion, and lateral chromatic aberration are illustrated in order from the left.

Likewise, various types of aberrations of the imaging lenses of Examples 2 to 4 are illustrated in FIGS. 7 to 9. The aberration diagrams shown in FIGS. 7 to 9 are all in the case where the object distance is infinity.

Table 9 summarizes the values corresponding to the respective conditional expressions (1) to (11) described above for each of Examples 1 to 4.

As is known from each numerical data and each aberration diagram, each Example has realized high imaging performance while achieving a reduction in overall lens length, an increase in the angle of view, and a small F-number.

It should be understood that the imaging lens of the present disclosure is not limited to the embodiments and each Example described above, and various changes and modifications may be made. For example, values of radius of curvature, surface distance, refractive index, Abbe number, and aspherical surface coefficient of each lens component are not limited to those shown in each numerical example and may take other values.

Each Example is described on the assumption that the imaging lens is used in fixed focus, but it is possible to take a configuration that allows focus adjustment. For example, it is possible to take a configuration that allows auto-focusing by, for example, paying out the entire lens system or moving some of the lenses on the optical axis.

TABLE 1

Example 1
f = 6.853, Bf = 1.433, Fno. = 1.64, 2ω = 76.2

| Si | Ri | Di | Ndj | νdj |
|---|---|---|---|---|
| 1(St) | ∞ | −0.194 | | |
| *2 | 3.40190 | 1.543 | 1.54488 | 54.87 |
| *3 | 1001.30736 | 0.134 | | |
| *4 | 12.64657 | 0.310 | 1.63350 | 23.62 |
| *5 | 4.22404 | 0.577 | | |
| *6 | 9.34163 | 0.923 | 1.54488 | 54.87 |
| *7 | −237.16219 | 0.946 | | |
| *8 | −4.96093 | 0.591 | 1.54488 | 54.87 |
| *9 | −2.00552 | 0.042 | | |
| *10 | −28.18158 | 0.823 | 1.63350 | 23.62 |
| *11 | 18.64190 | 0.505 | | |
| *12 | −1225.56796 | 0.852 | 1.54488 | 54.87 |
| *13 | 3.12408 | 0.717 | | |
| 14 | ∞ | 0.250 | 1.51633 | 64.14 |
| 15 | ∞ | 0.551 | | |
| 16(IMG) | ∞ | | | |

*Aspherical surface

TABLE 2

Example 1-Aspherical Surface Data

| Si | KA | A3 | A4 | A5 | A6 |
|---|---|---|---|---|---|
| 2 | 1.7492930E+00 | 0.0000000E+00 | 4.4179952E−03 | −6.4161921E−02 | 1.6383289E−01 |
| 3 | −4.4523794E+00 | −3.1081916E−14 | 2.3875241E−02 | −3.4063364E−01 | 1.0198015E+00 |
| 4 | −3.3532739E+02 | −2.9176169E−15 | −5.6367258E−02 | 3.8651584E−03 | 1.3007996E−01 |
| 5 | −1.9202039E+01 | −7.8320812E−15 | −2.7501000E−02 | 8.6598812E−02 | −2.3525701E−01 |
| 6 | 5.9728917E+00 | 1.3508609E−14 | −2.1933391E−01 | 1.5295648E+00 | −4.8265244E+00 |
| 7 | 1.8174546E+01 | −3.4584962E−14 | −6.9129065E−02 | 2.3337164E−01 | −3.6268944E−01 |
| 8 | −1.6430053E+02 | −2.0264567E−15 | −2.3615350E−01 | 2.1594143E−01 | 1.0201262E−01 |
| 9 | −1.6789934E−01 | 2.3124078E−15 | 5.5145797E−02 | 8.9710973E−02 | −2.4991100E−01 |
| 10 | −3.2013726E+00 | −8.6755706E−15 | 1.4196890E−01 | −6.0560329E−02 | −8.7246201E−02 |
| 11 | −5.6426851E+00 | 3.1472407E−15 | 7.5320667E−02 | −2.2492857E−02 | −3.7556882E−02 |
| 12 | −2.5647410E+01 | 8.8540680E−16 | 6.3979543E−02 | −7.1820240E−02 | 6.8426244E−03 |
| 13 | −3.4503748E+00 | −3.2746741E−16 | 1.1500174E−02 | −3.0661357E−02 | 3.6561049E−03 |

| Si | A7 | A8 | A9 | A10 | A11 |
|---|---|---|---|---|---|
| 2 | −1.9124232E−01 | 8.5014000E−02 | 2.5849462E−02 | −3.5443696E−02 | 1.2574335E−04 |
| 3 | −1.6657163E+00 | 1.7295309E+00 | −1.1797657E+00 | 5.4117038E−01 | −2.0634736E−01 |
| 4 | −1.6150392E−01 | 7.4806268E−02 | 7.4329730E−03 | −1.7752083E−02 | −9.6212127E−04 |
| 5 | 4.5317261E−01 | −4.3878018E−01 | 1.6989689E−01 | 1.1917500E−02 | −7.1619752E−03 |
| 6 | 7.9278389E+00 | −6.6716814E+00 | 1.6146527E+00 | 1.8119724E+00 | −1.4219906E+00 |
| 7 | 1.3419380E+00 | 3.2432347E−01 | −4.8937803E−01 | 2.6317029E−01 | −3.0861573E−02 |
| 8 | −2.5438391E−01 | 1.1003955E−01 | 3.6189352E−02 | −4.5102475E−02 | 9.1847094E−03 |
| 9 | 2.1608602E−01 | −8.5841219E−02 | 1.4135901E−02 | −3.9770971E−03 | 4.1020992E−03 |
| 10 | 7.3704190E−02 | −1.1943625E−04 | −2.3504796E−02 | 1.1105040E−02 | −6.7064608E−04 |
| 11 | 1.7694250E−02 | 2.1668899E−03 | −1.6926859E−03 | −3.4921085E−04 | 2.2795424E−04 |
| 12 | 1.0256739E−02 | −1.5041587E−03 | −9.9950771E−04 | 2.8123223E−04 | −2.7326507E−05 |
| 13 | 7.3682620E−03 | −2.0877248E−03 | −5.4348295E−04 | 2.8471401E−04 | −2.3229003E−05 |

| Si | A12 | A13 | A14 | A15 | A16 |
|---|---|---|---|---|---|
| 2 | 1.0037227E−02 | −2.5477517E−03 | −1.1073092E−03 | 6.1061946E−04 | −7.9933607E−05 |
| 3 | 1.0811485E−01 | −6.3846562E−02 | 2.5384911E−02 | −5.4989079E−03 | 4.9583804E−04 |
| 4 | 1.1923785E−03 | 6.0217973E−03 | −5.1981449E−03 | 1.6269244E−03 | −1.8428513E−04 |
| 5 | −1.0332089E−02 | −1.1527974E−02 | 1.8123237E−02 | −7.5304859E−03 | 1.0578045E−03 |
| 6 | −3.0523091E−02 | 4.4584895E−01 | −2.1719648E−01 | 4.3329794E−02 | −3.0862757E−03 |
| 7 | −1.8939898E−02 | −2.7437614E−03 | 8.0658691E−03 | −2.8174301E−03 | 3.1822053E−04 |
| 8 | 3.1585237E−03 | −1.1312596E−03 | −2.5528142E−04 | 1.5003394E−04 | −1.7669139E−05 |
| 9 | −1.5342662E−03 | 2.4017769E−04 | −5.8517301E−05 | 2.0514156E−05 | −2.4292588E−06 |
| 10 | −8.5810573E−04 | 1.1154599E−04 | 8.5686553E−05 | −2.9172821E−05 | 2.7571568E−06 |
| 11 | −1.9456940E−05 | −1.9982993E−07 | −1.2318718E−06 | 2.9894322E−07 | −1.6718750E−08 |
| 12 | 1.1000002E−05 | −1.9827074E−06 | −5.8283683E−07 | 1.9439637E−07 | −1.4673415E−08 |
| 13 | −3.5703171E−06 | 5.9826894E−07 | −1.5977247E−07 | 4.5286891E−08 | −3.8073863E−09 |

TABLE 3

Example 2
f = 6.854, Bf = 1.292, Fno. = 1.64, 2ω = 76.0

| Si | Ri | Di | Ndj | νdj |
|---|---|---|---|---|
| 1(St) | ∞ | −0.194 | | |
| *2 | 3.77740 | 1.533 | 1.54436 | 56.03 |
| *3 | −29.84371 | 0.145 | | |
| *4 | 13.60293 | 0.433 | 1.63350 | 23.62 |
| *5 | 4.46544 | 0.667 | | |
| *6 | 9.24941 | 0.929 | 1.54436 | 56.03 |
| *7 | 10728.45524 | 0.779 | | |
| *8 | −4.93322 | 0.683 | 1.54436 | 56.03 |
| *9 | −2.11154 | 0.097 | | |
| *10 | −21.46124 | 1.039 | 1.63350 | 23.62 |
| *11 | 12.36092 | 0.420 | | |
| *12 | 11.65516 | 0.958 | 1.54436 | 56.03 |
| *13 | 2.78442 | 0.717 | | |
| 14 | ∞ | 0.210 | 1.51633 | 64.14 |
| 15 | ∞ | 0.436 | | |
| 16(IMG) | ∞ | | | |

*Aspherical surface

TABLE 4

Example 2-Aspherical Surface Data

| Si | KA | A3 | A4 | A5 | A6 |
|---|---|---|---|---|---|
| 2 | 1.7542076E+00 | 8.2377863E−16 | 5.8130445E−03 | −6.7930941E−02 | 1.8053272E−01 |
| 3 | −4.7729226E+02 | −2.5029222E−15 | 7.0387792E−03 | −1.5853643E−01 | 3.4917173E−01 |
| 4 | −3.3581889E+02 | −2.5166722E−15 | −3.5193089E−02 | −1.2599723E−02 | 1.1233885E−01 |
| 5 | −1.9202126E+01 | −1.8722274E−15 | −1.6514321E−02 | 8.6145837E−02 | −2.5461554E−01 |
| 6 | 5.9729523E+00 | −4.4579458E−15 | −2.1779023E−01 | 1.5217445E+00 | −4.7685461E+00 |
| 7 | 2.2365443E+02 | −7.5821921E−15 | −7.5956426E−02 | 2.6718027E−01 | −4.3304628E−01 |
| 8 | −1.6456215E+02 | −2.6815237E−15 | −2.2376335E−01 | 2.0878006E−01 | 9.3939474E−02 |
| 9 | −1.6789789E+01 | 2.8466027E−15 | 7.2711810E−02 | 4.8565243E−02 | −1.8378383E−01 |
| 10 | −3.2013364E+00 | −1.9546907E−14 | 1.3596874E−01 | −5.5012498E−02 | −9.3851091E−02 |
| 11 | −5.6517435E+00 | 2.5264908E−15 | 6.5058628E−02 | −2.4413741E−02 | −3.5620544E−02 |
| 12 | −2.5632535E+01 | −7.6490557E−16 | 3.5448731E−02 | −5.6344884E−02 | 9.1578990E−03 |
| 13 | −3.4509285E+00 | −3.9578064E−17 | −3.0349533E−03 | −1.8523567E−02 | 4.7767494E−03 |

| Si | A7 | A8 | A9 | A10 | A11 |
|---|---|---|---|---|---|
| 2 | −2.3796074E−01 | 1.5529548E−01 | −2.9741792E−02 | −2.1296118E−02 | 1.3642255E−02 |
| 3 | −3.5175054E−01 | 1.7140747E−01 | −2.3596628E−02 | −2.4114266E−03 | −1.6217932E−02 |
| 4 | −1.3246407E−01 | 5.7923546E−02 | 9.1759339E−03 | −1.3361580E−02 | −2.1417506E−03 |
| 5 | 4.3441094E−01 | −3.8104819E−01 | 1.3923256E−01 | 4.2814317E−03 | 7.0913735E−04 |
| 6 | 7.7727200E+00 | −6.4858058E+00 | 1.5442676E+00 | 1.7558753E+00 | −1.3632459E+00 |
| 7 | 1.6838771E−01 | 4.1355683E−01 | −6.4537853E−01 | 3.5757812E−01 | −4.3051907E−02 |
| 8 | −2.4744342E−01 | 1.0686365E−01 | 3.5908964E−02 | −4.2716678E−02 | 8.3501208E−03 |
| 9 | 1.4177307E−01 | −4.5422173E−02 | 6.6528489E−03 | −3.0889040E−03 | 2.1390751E−03 |
| 10 | 7.3746461E−02 | 3.8779207E−03 | −2.4673732E−02 | 1.0821244E−02 | −7.5332131E−04 |
| 11 | 2.1341444E−02 | 2.6025812E−04 | −1.9119079E−03 | −2.1443063E−04 | 3.0401806E−04 |
| 12 | 6.9527668E−03 | −1.3916100E−03 | −5.9573927E−04 | 2.0501479E−04 | −3.1827847E−05 |
| 13 | 3.5977464E−03 | −1.2916844E−03 | −2.1154299E−04 | 1.2948382E−04 | −7.3824385E−06 |

| Si | A12 | A13 | A14 | A15 | A16 |
|---|---|---|---|---|---|
| 2 | −3.5399932E−03 | 1.3787475E−03 | −3.3995222E−04 | −2.3447834E−04 | 1.4384421E−04 |
| 3 | 1.7155319E−02 | −6.2917593E−03 | −3.3196746E−05 | 8.3981213E−04 | −2.8322548E−04 |
| 4 | 1.0185404E−03 | 4.4048726E−03 | −3.5338613E−03 | 1.0468830E−03 | −1.1348904E−04 |
| 5 | −8.7589890E−03 | −1.1567361E−02 | 1.5836198E−02 | −6.3291987E−03 | 8.7495615E−04 |
| 6 | −3.1836737E−02 | 4.2572618E−01 | −2.0673209E−01 | 4.1282080E−02 | −2.9662847E−03 |
| 7 | −2.7328091E−02 | −4.1020996E−03 | 1.2368463E−02 | −4.4583032E−03 | 5.2039030E−04 |
| 8 | 2.8342503E−03 | −1.0156537E−03 | −2.1677207E−04 | 1.3750455E−04 | −1.7517611E−05 |
| 9 | −5.7930988E−04 | 9.1175261E−05 | −3.0391818E−05 | 7.9551096E−06 | −6.6701252E−07 |
| 10 | −7.6906857E−04 | 1.2037754E−04 | 8.3801917E−05 | −3.2950702E−05 | 3.5401484E−06 |
| 11 | −5.3002212E−05 | 2.7936890E−06 | −1.5599534E−06 | 5.0496603E−07 | −4.2987457E−08 |
| 12 | 9.0007274E−06 | −8.7252389E−07 | −4.5606321E−07 | 1.1684527E−07 | −7.7908728E−09 |
| 13 | −2.3854520E−06 | 1.6432690E−07 | −3.4575424E−09 | 8.8495742E−09 | −9.9052922E−10 |

| Si | A17 |
|---|---|
| 2 | −2.1151906E−05 |
| 3 | 3.2163540E−05 |
| 4 | 0.0000000E+00 |
| 5 | 0.0000000E+00 |
| 6 | 0.0000000E+00 |
| 7 | 0.0000000E+00 |
| 8 | 0.0000000E+00 |
| 9 | 0.0000000E+00 |
| 10 | 0.0000000E+00 |
| 11 | 0.0000000E+00 |

TABLE 4-continued

Example 2-Aspherical Surface Data

| | |
|---|---|
| 12 | 0.0000000E+00 |
| 13 | 0.0000000E+00 |

TABLE 5

Example 3
f = 6.644, Bf = 1.237, Fno. = 1.64, 2ω = 77.6

| Si | Ri | Di | Ndj | vdj |
|---|---|---|---|---|
| 1(St) | ∞ | −0.194 | | |
| *2 | 3.61287 | 1.435 | 1.54436 | 56.03 |
| *3 | −31.27719 | 0.107 | | |
| *4 | 13.29554 | 0.392 | 1.63350 | 23.62 |
| *5 | 4.29979 | 0.643 | | |
| *6 | 9.41995 | 0.909 | 1.54436 | 56.03 |
| *7 | −162.25854 | 0.754 | | |
| *8 | −4.98409 | 0.678 | 1.54436 | 56.03 |
| *9 | −2.18816 | 0.140 | | |

TABLE 5-continued

Example 3
f = 6.644, Bf = 1.237, Fno. = 1.64, 2ω = 77.6

| Si | Ri | Di | Ndj | vdj |
|---|---|---|---|---|
| *10 | −33.07807 | 0.913 | 1.63350 | 23.62 |
| *11 | 12.14012 | 0.502 | | |
| *12 | 10.42330 | 0.939 | 1.54436 | 56.03 |
| *13 | 2.60223 | 0.717 | | |
| 14 | ∞ | 0.210 | 1.51633 | 64.14 |
| 15 | ∞ | 0.382 | | |
| 16(IMG) | ∞ | | | |

*Aspherical surface

TABLE 6

Example 3 Aspherical Surface Data

| Si | KA | A3 | A4 | A5 | A6 |
|---|---|---|---|---|---|
| 2 | 1.7542076E+00 | 7.2976041E−16 | 7.7457912E−03 | −7.3450637E−02 | 1.8215236E−01 |
| 3 | −4.7729226E+02 | 6.4186436E−15 | 6.5124414E−03 | −1.5925992E−01 | 3.5402613E−01 |
| 4 | −3.3581889E+02 | 1.0553787E−15 | −3.7242628E−02 | −1.4001382E−02 | 1.1901187E−01 |
| 5 | −1.9202126E+01 | 5.8247076E−15 | −1.6245414E−02 | 8.7626443E−02 | −2.4778710E−01 |
| 6 | 5.9729523E+00 | −1.4859819E−15 | −2.1985589E−01 | 1.5292389E+00 | −4.7677277E+00 |
| 7 | 2.2365443E+02 | 2.8433221E−14 | −7.6788438E−02 | 2.7567941E−01 | −4.3410251E−01 |
| 8 | −1.6456215E+02 | 3.6805227E−16 | −2.0032949E−01 | 1.9831024E−01 | 8.8916010E−02 |
| 9 | −1.6789789E−01 | −2.8466027E−15 | 7.6784075E−02 | 5.3901725E−02 | −1.8783955E−01 |
| 10 | −3.2013364E+00 | 3.4836072E−15 | 1.4173936E−01 | −5.7243926E−02 | −9.7525127E−02 |
| 11 | −5.6517435E+00 | −2.5912727E−15 | 6.8409783E−02 | −2.3836018E−02 | −3.7418476E−02 |
| 12 | −2.5632535E+01 | −2.9246390E−16 | 2.8889735E−02 | −5.7698882E−02 | 1.2529848E−02 |
| 13 | −3.4509285E+00 | −7.1240515E−16 | −2.8750470E−03 | −2.0185548E−02 | 5.4814014E−03 |

| Si | A7 | A8 | A9 | A10 | A11 |
|---|---|---|---|---|---|
| 2 | −2.3266723E−01 | 1.5277754E−01 | −3.2295342E−02 | −2.0051188E−02 | 1.4381214E−02 |
| 3 | −3.5106596E−01 | 1.6803777E−01 | −2.4149801E−02 | −1.4222180E−03 | −1.5936998E−02 |
| 4 | −1.2994654E−01 | 5.1583819E−02 | 7.6328260E−03 | −1.0592382E−02 | −1.6939827E−03 |
| 5 | 4.2713872E−01 | −3.8591207E−01 | 1.4630453E−01 | 4.8545529E−03 | −2.2098412E−03 |
| 6 | 7.7659516E+00 | −6.4854007E+00 | 1.5468803E+00 | 1.7558498E+00 | −1.3637121E+00 |
| 7 | 1.6213771E−01 | 4.1501732E−01 | −6.4304330E−01 | 3.5688241E−01 | −4.3541909E−02 |
| 8 | −2.4194356E−01 | 1.0652926E−01 | 3.4477664E−02 | −4.2177459E−02 | 8.5502057E−03 |
| 9 | 1.3983173E−01 | −4.4001782E−02 | 6.9154008E−03 | −3.2595134E−03 | 2.1326986E−03 |
| 10 | 7.6899066E−02 | 3.2201655E−03 | −2.5648006E−02 | 1.1333326E−02 | −6.1837985E−04 |
| 11 | 2.1046186E−02 | 5.9051789E−04 | −1.8252993E−03 | −2.4618158E−04 | 2.9270195E−04 |
| 12 | 7.1442318E−03 | −2.1432710E−03 | −6.1271263E−04 | 2.9771529E−04 | −3.0606278E−05 |
| 13 | 3.8705855E−03 | −1.4413105E−03 | −2.3188408E−04 | 1.4272824E−04 | −6.6545103E−06 |

| Si | A12 | A13 | A14 | A15 | A16 |
|---|---|---|---|---|---|
| 2 | −3.8517554E−03 | 1.2464675E−03 | −3.0028352E−04 | −2.2110272E−04 | 1.4179631E−04 |
| 3 | 1.7013506E−02 | −6.3680862E−03 | −2.4192357E−05 | 8.5006369E−04 | −2.8337468E−04 |
| 4 | 3.7479244E−04 | 4.3418128E−03 | −3.4558855E−03 | 1.0503654E−03 | −1.1742399E−04 |
| 5 | −8.3281354E−03 | −1.1006412E−02 | 1.5687874E−02 | −6.3705169E−03 | 8.8856163E−04 |
| 6 | −3.2001739E−02 | 4.2576015E−01 | −2.0667545E−01 | 4.1281757E−02 | −2.9718307E−03 |
| 7 | −2.7184318E−02 | −4.0498686E−03 | 1.2355727E−02 | −4.4605124E−03 | 5.2073443E−04 |
| 8 | 2.6604119E−03 | −1.0310323E−03 | −1.9118430E−04 | 1.3802527E−04 | −1.8939802E−05 |
| 9 | −5.8551196E−04 | 8.9565904E−05 | −2.7681811E−05 | 8.0612512E−06 | −8.1206355E−07 |
| 10 | −8.6141522E−04 | 1.1142917E−04 | 9.0893333E−05 | −3.2720135E−05 | 3.3368339E−06 |
| 11 | −5.1441195E−05 | 3.4479136E−06 | −1.5768698E−06 | 4.9099683E−07 | −4.3942256E−08 |
| 12 | 2.6158292E−06 | −9.2621094E−07 | −2.2740878E−07 | 1.1779015E−07 | −1.1110084E−08 |
| 13 | −2.9837629E−06 | 1.5405278E−07 | 1.0226756E−08 | 8.8574368E−09 | −1.1171366E−09 |

| | A17 |
|---|---|
| 2 | −2.1733725E−05 |
| 3 | 3.1626948E−05 |
| 4 | 0.0000000E+00 |

TABLE 6-continued

| | Example 3 Aspherical Surface Data |
|---|---|
| 5 | 0.0000000E+00 |
| 6 | 0.0000000E+00 |
| 7 | 0.0000000E+00 |
| 8 | 0.0000000E+00 |
| 9 | 0.0000000E+00 |
| 10 | 0.0000000E+00 |
| 11 | 0.0000000E+00 |
| 12 | 0.0000000E+00 |
| 13 | 0.0000000E+00 |

Example 4
f = 6.717, Bf = 1.430, Fno. = 1.60, 2ω = 77.0

| Si | Ri | Di | Ndj | vdj |
|---|---|---|---|---|
| 1(St) | ∞ | −0.194 | | |
| *2 | 3.52785 | 1.503 | 1.54436 | 56.03 |
| *3 | −121.73497 | 0.149 | | |
| *4 | 13.33253 | 0.313 | 1.63350 | 23.62 |
| *5 | 4.26391 | 0.539 | | |
| *6 | 7.53054 | 0.874 | 1.54436 | 56.03 |
| *7 | 1535.85840 | 0.778 | | |
| *8 | −4.64046 | 0.786 | 1.54436 | 56.03 |
| *9 | −1.89538 | 0.098 | | |
| *10 | −10.97566 | 0.744 | 1.63350 | 23.62 |
| *11 | 29.77009 | 0.456 | | |
| *12 | 25.04521 | 1.035 | 1.54436 | 56.03 |
| *13 | 2.88859 | 0.717 | | |
| 14 | ∞ | 0.210 | 1.51633 | 64.14 |
| 15 | ∞ | 0.575 | | |
| 16(IMG) | ∞ | | | |

*Aspherical surface

TABLE 8

Example 4-Aspherical Surface Data

| Si | KA | A3 | A4 | A5 | A6 |
|---|---|---|---|---|---|
| 2 | 1.7492930E+00 | 1.3473556E−16 | −7.9490842E−04 | −5.5395615E−02 | 1.5597170E−01 |
| 3 | −4.4523794E+00 | 1.9703955E−13 | 2.7106750E−02 | −3.5858845E−01 | 1.0633400E+00 |
| 4 | −3.3532739E+02 | 3.4225031E−15 | −6.6721239E−02 | 3.5861210E−03 | 1.2541231E−01 |
| 5 | −1.9202039E+01 | 6.4935388E−15 | −4.1256139E−02 | 8.1854199E−02 | −2.0318098E−01 |
| 6 | 5.9728917E+00 | 2.3581540E−14 | −2.1516171E−01 | 1.4789190E+00 | −4.6499579E+00 |
| 7 | 1.8174546E+01 | 5.0663201E−14 | −7.5374730E−02 | 2.6866136E−01 | −4.2585234E−01 |
| 8 | −1.6430053E+02 | 2.1071272E−16 | −2.5045592E−01 | 2.4077402E−01 | 9.8975840E−02 |
| 9 | −1.6789934E−01 | 1.8594889E−16 | 7.0136244E−02 | 5.8927574E−02 | −1.8361406E−01 |
| 10 | −3.2013726E+00 | 1.4974239E−14 | 1.6173242E−01 | −6.3527260E−02 | −9.5889148E−02 |
| 11 | −5.6426851E+00 | 1.7249627E−15 | 9.2890645E−02 | −3.1245795E−02 | −4.2435686E−02 |
| 12 | −2.5647410E+01 | 5.3421885E−16 | 5.9734892E−02 | −6.7403850E−02 | 7.7734709E−03 |
| 13 | −3.4503748E+00 | −4.0144413E−17 | 4.3393321E−03 | −1.9497421E−02 | 3.1519320E−03 |

| Si | A7 | A8 | A9 | A10 | A11 |
|---|---|---|---|---|---|
| 2 | −1.8398785E−01 | 8.0600009E−02 | 2.4570483E−02 | −3.2850226E−02 | 1.3179123E−04 |
| 3 | −1.7458291E+00 | 1.8294330E+00 | −1.2585091E+00 | 5.8100196E−01 | −2.2260818E−01 |
| 4 | −1.3535614E−01 | 5.2987427E−02 | 7.0893638E−03 | −1.1514212E−02 | −1.1338960E−03 |
| 5 | 4.1150814E−01 | −4.0369085E−01 | 1.5205066E−01 | 1.4247770E−02 | −6.8773620E−03 |
| 6 | 7.6031993E+00 | −6.3614085E+00 | 1.5261219E+00 | 1.7090410E+00 | −1.3295397E+00 |
| 7 | 1.5953502E−01 | 4.0381156E−01 | −6.2372122E−01 | 3.4474978E−01 | −4.2012648E−02 |
| 8 | −2.6831136E−01 | 1.1255431E−01 | 4.2315310E−02 | −4.6020684E−02 | 7.3295710E−03 |
| 9 | 1.4421658E−01 | −5.0387392E−02 | 7.1682943E−03 | −2.1555190E−03 | 2.2011275E−03 |
| 10 | 7.8334555E−02 | 6.8413546E−04 | −2.5754116E−02 | 1.2200540E−02 | −7.2337824E−04 |
| 11 | 2.3142757E−02 | 1.2965041E−03 | −2.3025331E−03 | −2.3708312E−04 | 3.2634389E−04 |
| 12 | 9.4150947E−03 | −2.0932019E−03 | −8.5445824E−04 | 3.6069281E−04 | −2.5053048E−05 |
| 13 | 3.8281703E−03 | −1.1435930E−03 | −2.2676020E−04 | 1.2122580E−04 | −7.6507319E−06 |

| Si | A12 | A13 | A14 | A15 | A16 |
|---|---|---|---|---|---|
| 2 | 9.0815550E−03 | −2.3119816E−03 | −9.7796798E−04 | 5.4319696E−04 | −7.1336650E−05 |
| 3 | 1.1749884E−01 | −7.0005317E−02 | 2.8038399E−02 | −6.1094010E−03 | 5.5343932E−04 |
| 4 | 5.3541584E−04 | 4.2958983E−03 | −3.5238558E−03 | 1.0780419E−03 | −1.2040888E−04 |
| 5 | −9.6985670E−03 | −9.5365172E−03 | −6.1749264E−03 | 1.5137805E−02 | 8.4921016E−04 |
| 6 | −2.9532906E−02 | 4.1194845E−01 | −1.9931592E−01 | 3.9555646E−02 | −2.8105295E−03 |
| 7 | −2.5994051E−02 | −3.8650073E−03 | 1.1769188E−02 | −4.2405199E−03 | 4.9404565E−04 |
| 8 | 3.5513588E−03 | −9.2510876E−04 | −2.9265252E−04 | 1.3502866E−04 | −1.4718922E−05 |
| 9 | −7.7570394E−04 | 9.9217419E−05 | −1.9278737E−05 | 8.3701732E−06 | −1.1036928E−06 |
| 10 | −9.6746915E−04 | 1.2399172E−04 | 9.9357004E−05 | −3.3888267E−05 | 3.2153519E−06 |
| 11 | −5.1438587E−05 | 3.9387016E−07 | −1.0860920E−06 | 4.8870453E−07 | −4.5722808E−08 |

TABLE 8-continued

Example 4-Aspherical Surface Data

| 12 | −1.3903507E−06 | −1.3064658E−06 | −3.5669127E−08 | 1.4059309E−07 | −1.7657225E−08 |
| 13 | −1.8811167E−06 | 1.7479769E−07 | −1.9084402E−08 | 9.4768793E−09 | −9.1599907E−10 |

TABLE 9

Values of Conditional Expressions

| Expression No. | Conditional Expression | Example 1 | Example 2 | Example 3 | Example 4 |
| --- | --- | --- | --- | --- | --- |
| 1 | f/f1 | 1.10 | 1.10 | 1.10 | 1.06 |
| 2 | f/f2 | −0.67 | −0.64 | −0.65 | −0.67 |
| 3 | f/L6f | −0.01 | 0.59 | 0.64 | 0.27 |
| 4 | f/f3 | 0.42 | 0.40 | 0.41 | 0.48 |
| 5 | f/f4 | 1.19 | 1.10 | 1.01 | 1.26 |
| 6 | f/f6 | −1.2 | −1.0 | −1.0 | −1.1 |
| 7 | (L1r + L1f)/(L1r − L1f) | 1.0 | 0.8 | 0.8 | 0.9 |
| 8 | (L5r + L5f)/(L5r − L5f) | −0.20 | −0.27 | −0.46 | 0.46 |
| 9 | (L4r + L4f)/(L4r − L4f) | −2.4 | −2.5 | −2.6 | −2.4 |
| 10 | f · P34 | −0.73 | −0.75 | −0.70 | −0.79 |
| 11 | f · tanω/L6r | 1.7 | 1.9 | 2.1 | 1.8 |

The paraxial radius of curvature, surface distance, refractive index, and Abbe number described above were obtained by an optical measurement expert through measurement by the following method.

The paraxial radius of curvature was obtained in the following steps by measuring the lens using an ultra-accuracy 3-D profilometer, UA3P (product of Panasonic Factory Solutions Corporation). A paraxial radius of curvature $R_m$ (m is a natural number) and a cone constant $K_m$ are tentatively set and inputted to the UA3P and an $n^{th}$ order aspherical surface coefficient An of the aspherical surface shape formula is calculated from these and measurement data using an auxiliary fitting function of the UA3P. It is assumed, in the aspherical surface shape formula (A), that $C=1/R_m$ and $KA=K_m-1$. From $R_m$, $K_m$, An, and the aspherical surface shape formula, a depth Z of the aspherical surface in an optical axis direction according to the height h from the optical axis is calculated. A difference between a calculated depth Z and a measured depth Z' is obtained at each height h from the optical axis, then a determination is made whether or not the difference is within a predetermined range, and if the difference is within the predetermined range, the set $R_m$ is taken as the paraxial radius of curvature. On the other hand, if the difference is outside of the predetermined range, at least one of the values of $R_m$ and $K_m$ used in the calculation of the difference is set to $R_{m+1}$ and $K_{m+1}$ and inputted to the UA3P, then processing identical to that described above is performed, and determination processing whether or not a difference between a calculated depth Z and a measured depth Z' at each height h from the optical axis is within the predetermined range is repeated until the difference between the calculated depth Z and the measured depth Z' at each height h from the optical axis remains within the predetermined range. The term, within a predetermined range, as used herein refers to within 200 nm. The range of h is a range corresponding to 0 to ⅕ of the maximum outer diameter.

The surface distance was obtained by performing measurement using a thickness and distance measuring device for coupling lenses, OptiSurf (product of Trioptics).

The refractive index was obtained by measuring a test object with the temperature of the test object being maintained at 25° C. using a precision refractometer, KPR-2000 (product of Shimadzu Corporation). The refractive index measured at the d-line (wavelength 587.6 nm) is taken as Nd. Likewise, the refractive indices measured at the e-line (wavelength 546.1 nm), the F-line (wavelength 486.1 nm), the C-line (wavelength 656.3 nm) and the g-line (wavelength 435.8 nm) are taken as Ne, NF, NC, and Ng respectively. The Abbe number vd with respect to the d-line was obtained by substituting the Nd, NF, and NC obtained by the aforementioned measurements in a formula, $vd=(Nd-1)/(NF-NC)$.

What is claimed is:

1. An imaging lens, consisting of six lenses, composed of, in order from the object side:
    a first lens having a positive refractive power with a convex surface on the object side;
    a second lens having a negative refractive power;
    a third lens having a positive refractive power;
    a fourth lens having a positive refractive power;
    a fifth lens having a negative refractive power with a concave surface on the image side; and
    a sixth lens having a negative refractive power,
        wherein the following conditional expressions are satisfied:

$$0<f/f1<1.22 \tag{1}$$

$$-0.68<f/f2<0 \tag{2}$$

$$-0.15<f/L6f<0.9 \tag{3}$$

where:
    f is the focal length of the entire system;
    f1 is the focal length of the first lens;
    f2 is the focal length of the second lens; and
    L6f is the paraxial radius of curvature of the object side surface of the sixth lens.

2. The imaging lens of claim 1, wherein the sixth lens has a concave surface on the image side.

3. The imaging lens of claim 1, wherein the fourth lens has a meniscus shape with a concave surface on the object side.

4. The imaging lens of claim 1, wherein the second lens has a meniscus shape with a convex surface on the object side.

5. The imaging lens of claim 1, wherein the fifth lens has a biconcave shape.

6. The imaging lens of claim 1, wherein the third lens has a convex shape on the object side.

7. The imaging lens of claim 1, wherein the following conditional expression is further satisfied:

$$0.15<f/f3<3 \tag{4}$$

where f3 is the focal length of the third lens.

8. The imaging lens of claim 1, wherein the following conditional expression is further satisfied:

$$0.65<f/f4<3 \tag{5}$$

where f4 is the focal length of the fourth lens.

9. The imaging lens of claim 1, wherein the following conditional expression is further satisfied:

$$-3<f/f6<-0.5 \tag{6}$$

where f6 is the focal length of the sixth lens.

10. The imaging lens of claim 1, wherein the following conditional expression is further satisfied:

$$0.5 < (L1r+L1f)/(L1r-L1f) < 3 \quad (7)$$

where:
L1$f$ is the paraxial radius of curvature of the object side surface of the first lens; and
L1$r$ is the paraxial radius of curvature of the image side surface of the first lens.

11. The imaging lens of claim 1, wherein the following conditional expression is further satisfied:

$$-7.5 < (L4r+L4f)/(L4r-L4f) < 0 \quad (9)$$

where:
L4$f$ is the paraxial radius of curvature of the object side surface of the fourth lens; and
L4$r$ is the paraxial radius of curvature of the image side surface of the fourth lens.

12. The imaging lens of claim 1, wherein the following conditional expression is further satisfied:

$$-1.4 < f \cdot P34 < 0 \quad (10)$$

where P34 is the refractive power of the air lens formed between the image side surface of the third lens and the object side surface of the fourth lens, and the refractive power of the air lens may be obtained by the following formula (P):

$$P34 = \frac{1-Nd3}{L3r} + \frac{Nd4-1}{L4f} - \frac{(1-Nd3) \times (Nd4-1) \times D7}{L3r \times L4f} \quad (P)$$

where:
Nd3 is the refractive index of the third lens with respect to the d-line;
Nd4 is the refractive index of the fourth lens with respect to the d-line;
L3$r$ is the paraxial radius of curvature of the image side surface of the third lens;
L4$f$ is the paraxial radius of curvature of the object side surface of the fourth lens; and
D7 is the air space between the third lens and the fourth lens on the optical axis.

13. The imaging lens of claim 1, wherein the following conditional expression is further satisfied:

$$0.5 < f \cdot \tan \omega / L6r < 20 \quad (11)$$

where:
$\omega$ is the maximum half angle of view when an object at infinity is in focus; and
L6$r$ is the paraxial radius of curvature of the image side surface of the sixth lens.

14. The imaging lens of claim 1, wherein the following conditional expression is further satisfied:

$$0.31 < f/f1 < 1.2 \quad (1\text{-}1).$$

15. The imaging lens of claim 1, wherein the following conditional expression is further satisfied:

$$-0.68 < f/f2 < -0.1 \quad (2\text{-}1).$$

16. The imaging lens of claim 1, wherein the following conditional expression is further satisfied:

$$-0.1 < f/L6f < 0.9 \quad (3\text{-}1).$$

17. The imaging lens of claim 7, wherein the following conditional expression is further satisfied:

$$0.15 < f/f3 < 1.7 \quad (4\text{-}1)$$

where f3 is the focal length of the third lens.

18. The imaging lens of claim 8, wherein the following conditional expression is further satisfied:

$$0.68 < f/f4 < 2.1 \quad (5\text{-}1)$$

where f4 is the focal length of the fourth lens.

19. An imaging apparatus equipped with the imaging lens of claim 1.

20. An imaging lens, consisting of six lenses, composed of, in order from the object side:
a first lens having a positive refractive power with a convex surface on the object side;
a second lens having a negative refractive power;
a third lens having a positive refractive power;
a fourth lens having a positive refractive power;
a fifth lens having a negative refractive power with a concave surface on the image side; and
a sixth lens having a negative refractive power,
wherein the following conditional expressions are satisfied:

$$0 < f/f1 < 1.22 \quad (1)$$

$$-0.68 < f/f2 < 0 \quad (2)$$

$$-0.15 < f/L6f < 1.25 \quad (3)$$

where:
f is the focal length of the entire system;
f1 is the focal length of the first lens;
f2 is the focal length of the second lens; and
L6$f$ is the paraxial radius of curvature of the object side surface of the sixth lens,
wherein the following conditional expression is further satisfied:

$$-0.55 < (L5r+L5f)/(L5r-L5f) < 1$$

where:
L5$f$ is the paraxial radius of curvature of the object side surface of the fifth lens; and
L5$r$ is the paraxial radius of curvature of the image side surface of the fifth lens.

* * * * *